(12) United States Patent
Dole

(10) Patent No.: US 11,441,662 B2
(45) Date of Patent: Sep. 13, 2022

(54) CAM WITH STOP SURFACES

(71) Applicant: Victaulic Company, Easton, PA (US)

(72) Inventor: Douglas R. Dole, Whitehouse Station, NJ (US)

(73) Assignee: Victaulic Company, Easton, PA (US)

( * ) Notice: Subject to any disclaimer, the term of this patent is extended or adjusted under 35 U.S.C. 154(b) by 461 days.

(21) Appl. No.: 16/677,711

(22) Filed: Nov. 8, 2019

(65) Prior Publication Data

US 2020/0070231 A1 Mar. 5, 2020

Related U.S. Application Data

(62) Division of application No. 15/585,457, filed on May 3, 2017, now Pat. No. 10,525,516.

(51) Int. Cl.
| | |
|---|---|
| *F16H 53/00* | (2006.01) |
| *B21D 15/00* | (2006.01) |
| *B21D 17/04* | (2006.01) |
| *B21H 7/18* | (2006.01) |

(52) U.S. Cl.
CPC ............. *F16H 53/00* (2013.01); *B21D 15/00* (2013.01); *B21D 17/04* (2013.01); *B21H 7/182* (2013.01)

(58) Field of Classification Search
CPC ......... B23Q 5/344; B23Q 5/345; F16H 53/00; F16H 53/02; B21D 15/00; B21D 17/04; B21H 7/182
See application file for complete search history.

(56) References Cited

U.S. PATENT DOCUMENTS

| | | | |
|---|---|---|---|
| 1,414,668 | A | 5/1922 | Reed |
| 2,004,816 | A | 6/1935 | Lindgren |
| 2,089,475 | A | 8/1937 | Grotnes |
| 2,179,849 | A | 11/1939 | Freeze |
| 2,679,089 | A | 5/1954 | Opitz et al. |

(Continued)

FOREIGN PATENT DOCUMENTS

| | | |
|---|---|---|
| CN | 201249229 Y | 6/2009 |
| CN | 201320572 Y | 10/2009 |

(Continued)

OTHER PUBLICATIONS

Dole, Douglas R.; U.S. Appl. No. 16/998,385; Pipe Grooving Device Having Flared Cup; filed Aug. 20, 2020; 61 pages.

(Continued)

*Primary Examiner* — Adam D Rogers
(74) *Attorney, Agent, or Firm* — Ballard Spahr LLP

(57) ABSTRACT

A device for cold working pipe elements has two or more cams, each having a gear which meshes with a pinion to turn all of the cams. Each cam has a cam surface with a region of increasing radius and may have a region of constant radius extending around a cam body. Each cam also has a traction surface extending around a cam body. A discontinuity in each cam surface is aligned with a gap in the traction surface of each cam. The discontinuities and gaps provide clearance for insertion and removal of the pipe element between the cams to form a circumferential groove when the cams are rotated. A cup adjacent the pinion is movable along the pinion axis to engage and disengage from a stop surface on one of the cams. Engagement between the cup and a stop surface prevents rotation of the cam.

28 Claims, 22 Drawing Sheets

(56) References Cited

U.S. PATENT DOCUMENTS

| | | | |
|---|---|---|---|
| 2,684,101 A | 7/1954 | Clerke | |
| 2,686,442 A | 8/1954 | Wilson | |
| 2,809,687 A | 10/1957 | Ogle | |
| 2,821,099 A | 1/1958 | Beecher | |
| 2,942,567 A | 6/1960 | Kargard et al. | |
| 3,260,089 A | 7/1966 | Hazelton et al. | |
| 3,260,090 A | 7/1966 | Sofranko | |
| 3,277,684 A | 10/1966 | Gareri | |
| 3,299,680 A | 1/1967 | Thompson | |
| 3,383,892 A | 5/1968 | Brothen | |
| 3,387,477 A | 6/1968 | Shupper | |
| 3,473,559 A | 10/1969 | Joslin | |
| 3,564,887 A | 2/1971 | Novak et al. | |
| 3,595,049 A | 7/1971 | Holt | |
| 3,686,917 A | 8/1972 | Hikida et al. | |
| 3,717,017 A | 2/1973 | Vukovich | |
| 3,827,269 A | 8/1974 | Hoagland et al. | |
| 3,831,416 A | 8/1974 | Wolfe | |
| 3,869,895 A | 3/1975 | Holub | |
| 4,018,462 A | 4/1977 | Saka | |
| 4,043,161 A | 8/1977 | Toma et al. | |
| 4,142,393 A | 3/1979 | Nagel | |
| 4,143,535 A | 3/1979 | Bouman | |
| 4,173,877 A | 11/1979 | Kreiskorte | |
| 4,372,026 A | 2/1983 | Mosing | |
| 4,389,875 A | 6/1983 | Grotnes, II | |
| 4,660,803 A | 4/1987 | Johnston et al. | |
| 4,838,066 A | 6/1989 | Marcon et al. | |
| 5,002,318 A | 3/1991 | Witter | |
| 5,040,729 A | 8/1991 | Carrozza | |
| 5,245,848 A | 9/1993 | Lee, Jr. et al. | |
| 5,291,769 A | 3/1994 | Miyano | |
| 5,435,213 A | 7/1995 | Buck | |
| 5,479,961 A | 1/1996 | DeMarsh et al. | |
| 5,528,919 A | 6/1996 | McGrady et al. | |
| 5,778,715 A | 7/1998 | Lippka | |
| 5,911,939 A | 6/1999 | Jenkins | |
| 5,950,472 A | 9/1999 | Grotnes | |
| 6,145,892 A | 11/2000 | Weber | |
| 6,257,627 B1 | 7/2001 | Fujiwara et al. | |
| 6,272,895 B1 | 8/2001 | Hamm | |
| 6,338,263 B1 | 1/2002 | Obata et al. | |
| 6,547,785 B1 | 4/2003 | Katayama et al. | |
| 6,776,018 B2 | 8/2004 | Hamm et al. | |
| 6,968,719 B2 | 11/2005 | Zirferer | |
| 6,976,712 B2 | 12/2005 | Lukach | |
| 7,997,112 B2 | 8/2011 | Sandman et al. | |
| 9,003,851 B2 | 4/2015 | Obata et al. | |
| 10,525,516 B2 * | 1/2020 | Dole | B23Q 5/344 |
| 10,525,517 B2 | 1/2020 | Dole | |
| 10,960,450 B2 | 3/2021 | Dole | |
| 11,173,533 B2 | 11/2021 | Dole | |
| 2002/0007514 A1 | 1/2002 | Dole et al. | |
| 2002/0129684 A1 | 9/2002 | Oswald | |
| 2003/0192357 A1 | 10/2003 | Hamm et al. | |
| 2003/0226387 A1 | 12/2003 | Dole et al. | |
| 2004/0221635 A1 | 11/2004 | Bauder | |
| 2005/0178179 A1 | 8/2005 | Dole | |
| 2006/0011017 A1 | 1/2006 | Kathan | |
| 2008/0012326 A1 | 1/2008 | Braathen et al. | |
| 2011/0232434 A1 | 9/2011 | Bortoli | |
| 2011/0271797 A1 | 11/2011 | Light et al. | |
| 2016/0236256 A1 | 8/2016 | Price et al. | |
| 2017/0151596 A1 | 6/2017 | Dole | |
| 2018/0318694 A1 | 11/2018 | Paglierani et al. | |
| 2019/0184441 A1 | 6/2019 | Dole | |
| 2020/0016644 A1 * | 1/2020 | Dole | F16H 53/00 |
| 2020/0070232 A1 * | 3/2020 | Dole | B21D 17/04 |
| 2021/0053102 A1 | 2/2021 | Dole | |
| 2021/0170468 A1 | 6/2021 | Dole | |
| 2022/0032354 A1 * | 2/2022 | Dole | B21H 7/182 |
| 2022/0088662 A1 * | 3/2022 | Dole | B21D 17/04 |

FOREIGN PATENT DOCUMENTS

| | | | | |
|---|---|---|---|---|
| CN | 101856706 A | | 10/2010 | |
| CN | 202100679 U | | 1/2012 | |
| CN | 102699168 A | | 10/2012 | |
| CN | 202834505 U | | 3/2013 | |
| CN | 204523912 U | | 8/2015 | |
| CN | 109248946 A | * | 1/2019 | B21D 17/04 |
| DE | 2441387 A1 | | 3/1976 | |
| DE | 102006062208 | | 6/2008 | |
| EP | 1038603 A2 | | 9/2000 | |
| GB | 1317148 | | 5/1973 | |
| JP | S63126623 A | | 5/1988 | |
| JP | H11207411 A | | 8/1999 | |
| KR | 20060014887 A | * | 2/2006 | |
| KR | 20060123162 A | * | 12/2006 | |
| RU | 2071852 C1 | | 1/1997 | |
| RU | 2147957 C1 | | 4/2000 | |
| SU | 628973 A1 | | 10/1978 | |
| SU | 1687330 A1 | | 10/1991 | |
| TW | 291451 B | | 11/1996 | |

OTHER PUBLICATIONS

Dole, Douglas R.; U.S. Appl. No. 17/030,418; Pipe Grooving Device; filed Sep. 24, 2020; 48 pages.

Author Unknown; SP—The Best Pipe in the World, Company Website, Products, Press Fittings; obtained online at http://www.superpipe.co.za/SP_PressFittings.htm on Jan. 4, 2020; pp. 1-2.

* cited by examiner

CAM WITH STOP SURFACES

CROSS REFERENCE TO RELATED APPLICATIONS

This application claims benefit of priority to and is a divisional application of U.S. patent application Ser. No. 15/585,457, filed May 3, 2017, which application is hereby incorporated by reference herein.

FIELD OF THE INVENTION

This invention relates to machines using cams to cold work pipe elements.

BACKGROUND

Cold working of pipe elements, for example, impressing a circumferential groove in a pipe element to accept a mechanical pipe coupling, is advantageously accomplished using roll grooving machines having an inner roller which engages an inside surface of the pipe element and an outer roller which simultaneously engages an outside surface of the pipe element opposite to the inner roller. As the pipe is rotated about its longitudinal axis, often by driving the inner roller, the outer roller is progressively forced toward the inner roller. The rollers have surface profiles which are impressed onto the pipe element circumference as it rotates, thereby forming a circumferential groove.

There are various challenges which this technique faces if it is to cold work pipe elements with the required tolerances to the necessary precision. Most pressing are the difficulties associated with producing a groove of the desired radius (measured from the center of the pipe element bore to the floor of the groove) within a desired tolerance range. These considerations have resulted in complicated prior art devices which, for example, require actuators for forcing the rollers into engagement with the pipe element and the ability for the operator to adjust the roller travel to achieve the desired groove radius. Additionally, prior art roll grooving machines have low production rates, often requiring many revolutions of the pipe element to achieve a finished circumferential groove. There is clearly a need for devices, for example, those using cams, to cold work pipe elements which are simple yet produce results with less operator involvement.

SUMMARY

The invention concerns a cam for cold working a pipe element. In one example embodiment the cam comprises a cam body having an axis of rotation. A cam surface extends around the cam body. The cam surface comprises a region of increasing radius and a discontinuity of the cam surface. The cam surface may also comprise a region of constant radius positioned adjacent to the discontinuity. The radii are measured about and from the axis of rotation. A traction surface extends around the cam body. The traction surface comprises a plurality of projections extending transversely to the axis of rotation. The traction surface has a gap therein. The gap is aligned axially with the discontinuity of the cam surface. A stop surface projects from the cam body transversely to the axis of rotation. The first stop surface is positioned adjacent to the discontinuity of the cam surface. In one example embodiment, a rib projects from the cam body. The rib is positioned adjacent to the cam surface and extends around a portion of the cam body. The first stop surface is positioned on a first end of the rib. Another example further comprises a second stop surface positioned on a second end of the rib. The second stop surface projects from the cam body transversely to the axis of rotation. The second stop surface is positioned adjacent to the discontinuity of the cam surface and in spaced relation to the first stop surface. In an example embodiment the first and second stop surfaces each have a concave curvature.

In one example embodiment the traction surface overlies the cam surface. In another example embodiment the traction surface is positioned on the cam body in spaced relation to the cam surface. By way of example the cam further comprises a gear mounted on the cam body coaxially with the axis of rotation. In one example embodiment the cam surface is positioned between the gear and the traction surface. Further by way of example the cam surface is positioned proximate to the traction surface. In another example the stop surface is positioned between the gear and the cam surface.

In an example embodiment the traction surface has a constant radius measured about and from the axis of rotation.

In a further example embodiment the cam comprises a cam body having an axis of rotation. A plurality of cam surfaces extend around the cam body. Each cam surface comprises a respective region of increasing radius. Each cam surface may also comprise a respective region of constant radius. The radii are measured from and about the axis of rotation. All of the cam surfaces are circumferentially aligned with one another. Respective discontinuities of the cam surfaces are positioned between each of the cam surfaces. By way of example, at least one stop surface, or a plurality of stop surfaces project from the cam body transversely to the axis of rotation. Each stop surface is positioned adjacent to one of the respective discontinuities of the cam surfaces. In an example embodiment each stop surface may have a concave curvature. An example embodiment further comprises at least one rib or a plurality of ribs. Each rib is positioned adjacent to a respective one of the cam surfaces and extends around a portion of the cam body. Each rib has first and second oppositely disposed ends. One of the stop surfaces is positioned at each end of the ribs. By way of example all of the ribs may be circumferentially aligned with one another.

In an example embodiment the cams further comprise a plurality of traction surfaces extending around the cam body. Each traction surface comprises a plurality of projections extending transversely to the axis of rotation. A respective gap in the traction surfaces is positioned between each of the traction surfaces. Each gap is aligned axially with a respective discontinuity of the cam surface. In an example embodiment, all of the traction surfaces are circumferentially aligned with one another. In a particular example, the traction surfaces overlie the cam surfaces. In another example, the traction surfaces are positioned on the cam body in spaced relation to the cam surfaces.

By way of example, a cam further comprises a gear mounted on the cam body coaxially with the axis of rotation. In a specific example the cam surfaces are positioned between the gear and the traction surfaces. In another example the cam surfaces are positioned proximate to the traction surfaces. A specific example embodiment comprises at most two of the cam surfaces and two of the discontinuities of the cam surfaces. Another example embodiment comprises at most two of the cam surfaces, two of the discontinuities of the cam surfaces, two of the traction surfaces and two of the gaps in the traction surfaces and at least two of the stop surfaces. In an example embodiment the stop surface or surfaces are positioned between the gear and the cam surfaces.

The invention further encompasses a device for cold working a pipe element. In one example embodiment the device comprises a housing. A plurality of gears are mounted within the housing. Each one of the gears is rotatable about a respective one of a plurality of axes of rotation. The axes of rotation are parallel to one another. The gears are positioned about a central space for receiving the pipe element. A plurality of cam bodies are each mounted on a respective one of the gears. Each one of a plurality of cam surfaces extend around a respective one of the cam bodies and are engageable with the pipe element received within the central space. Each one of the cam surfaces comprises a region of increasing radius and a discontinuity of the cam surface. Each one of the cam surfaces may also comprise a region of constant radius positioned adjacent to the discontinuity. Each one of the radii is measured about and from a respective one of the axes of rotation. At least one traction surface extends around one of the cam bodies. The at least one traction surface comprises a plurality of projections extending transversely to the axis of rotation of the one cam body. The at least one traction surface has a gap therein. The gap is aligned axially with the discontinuity of one the cam surface surrounding the one cam body. At least one stop surface projects from one of the cam bodies transversely to the axis of rotation of one of the gears. The at least one stop surface is positioned adjacent to the discontinuity of the cam surface on the one cam body. A pinion is mounted within the central space within the housing. A cup is adjacent to the pinion. The cup receives the pipe element upon insertion. The pinion meshes with the plurality of gears and is rotatable about a pinion axis oriented parallel to the axes of rotation. In one embodiment the pinion is movable relatively to the housing along the pinion axis to position the cup between a first position, wherein the cup engages the stop surface thereby preventing continuous rotation of the cam bodies, and a second position, wherein the cup is out of engagement with the stop surface, thereby permitting continuous rotation of the cam bodies. By way of example a spring acts between the pinion and the housing to bias the cup into the first position. The cup may be fixedly mounted on the pinion or free-wheeling relatively to the pinion. In another example embodiment a spring acts between the cup and the pinion to bias the cup into the first position. An example embodiment further comprises a rib projecting from the one cam body. The rib is positioned adjacent to the cam surface on the one cam body and extends around a portion of the one cam body. The first stop surface is positioned on a first end of the rib. In an example embodiment a second stop surface is positioned on a second end of the rib. The second stop surface projects from the cam body transversely to the axis of rotation. The second stop surface is positioned adjacent to the discontinuity of the cam surface of the one cam body and in spaced relation to the first stop surface. In an example embodiment the first and second stop surfaces may each have a concave curvature.

Another example embodiment comprises a plurality of traction surfaces. Each one of the traction surfaces extends around a respective one of the cam bodies. Each one of the traction surfaces comprises a plurality of projections extending transversely to a respective one of the axes of rotation. Each one of the traction surfaces has a gap therein. Each gap is aligned axially with a respective one of the discontinuities of one of the cam surfaces on each one of the cam bodies. In an example embodiment the device further comprises a plurality of stop surfaces. Each one of the stop surfaces is positioned adjacent to a respective one of the discontinuities of one of the cam surfaces on each one of the cam bodies. An example may further comprise a plurality of ribs. Each rib projects from a respective one of the cam bodies. The ribs are positioned adjacent to the cam surfaces on each cam body and extend around a portion of the cam bodies. Each stop surface is positioned on an end of each of the ribs in this example. In an example embodiment the at least one traction surface overlies one of the cam surfaces. In another example embodiment the at least one traction surface is positioned on the one cam body in spaced relation to the cam surface extending around the one cam body. In another example at least one stop surface is positioned between the cam surface and the gear on the one cam body. By way of example a device may comprise at most, three gears. Each gear comprises one of the cam bodies and the cam surfaces. Another example embodiment may comprise at most, two gears. Each gear comprises one of the cam bodies and the cam surfaces.

In an example embodiment, the one cam surface is positioned between the gear and the at least one traction surface of the one cam body. by way of further example, the one cam surface is positioned proximate to the at least one traction surface of the one cam body.

An example embodiment further comprises a cup abutting the pinion. The cup receives the pipe element upon insertion of the pipe element into the central space. In one example embodiment the cup may be attached to the pinion, for example by fasteners or integrally formed therewith.

By way of further example, a first finger extends from a first one of the cam bodies in a direction parallel to and offset from a first one of the axes of rotation about which the first one of the cam bodies rotates. An actuator is movably mounted on the housing. The actuator is movable into engagement with the first finger for rotating the first one of the cam bodies about the first one of the axes of rotation. In an example embodiment the actuator comprises a lever pivotably mounted on the housing. The lever has a first surface engageable with the first finger for rotating the first one of the cam bodies about the first one of the axes. In a further example the lever has a second surface engageable with the finger for pivoting the lever into a ready position upon rotation of the first one of the cam bodies. In another example a second finger extends from a second one of the cam bodies in a direction parallel to and offset from a second one of the axes of rotation about which the second one of the cam bodies rotates. A stop is movably mounted on the housing. The stop is movable into engagement with the second finger for preventing rotation of the second one of the cam bodies about the second one of the axes of rotation. Upon movement of the actuator into engagement with the first finger, the stop further is movable out of engagement with the second finger for permitting rotation of the second one of the cam bodies.

In one example embodiment the stop comprises a hook pivotably mounted on the housing. The hook has a spur extending therefrom and is engageable with the actuator for rotating the hook out of engagement with the second finger upon movement of the actuator.

An example device further comprises a chuck for receiving the pipe element. The chuck is rotatable about a chuck axis. The chuck axis is arranged coaxially with the pinion axis. By way of example the housing is pivotably and axially slidably mounted adjacent to the chuck.

In another example embodiment the device further comprises an electrical motor engaged with the pinion. In a specific example embodiment the electrical motor may comprise a servomotor or a stepper motor. The device further comprises a controller in communication with the electrical motor for controlling the number of rotations of the electrical motor and thereby the cam bodies.

Another example embodiment comprises a clutch operating between the electrical motor and the pinion for controlling the number of rotations of the pinion and thereby the cam bodies. A further example embodiment comprises a crank coupled with the pinion. The crank permitting manual turning of the pinion and thereby the gears. In a particular example embodiment the crank is directly coupled with the pinion.

The invention further encompasses an example device for cold working a pipe element comprising a housing. A plurality of gears are mounted within the housing. Each one of the gears is rotatable about a respective one of a plurality of axes of rotation. The axes of rotation are parallel to one another. The gears are positioned about a central space for receiving the pipe element. The example device has a plurality of cam bodies, each cam body is mounted on a respective one of the gears. A plurality of cam surfaces extend around each cam body. Each cam surface is engageable with the pipe element received within the central space and comprises a region of increasing radius and a region of constant radius. The radii are measured about and from one of the axes of rotation. All of the cam surfaces on each cam body are circumferentially aligned with one another. A respective discontinuity of the cam surfaces is positioned between each of the cam surfaces on each cam body. A plurality of stop surfaces project from one of the cam bodies transversely to the axes of rotation of the one cam body. The stop surfaces are positioned adjacent to a discontinuity of the one cam surface. A pinion is mounted within the central space within the housing. The pinion meshes with the plurality of gears and is rotatable about a pinion axis oriented parallel to the axes of rotation. A cup is adjacent to the pinion. The cup receives the pipe element upon insertion of the pipe element into the central space. In one example embodiment the pinion is movable relatively to the housing along the pinion axis between a first position, wherein the cup engages one of the stop surfaces thereby preventing continuous rotation of the cam bodies, and a second position wherein the cup is out of engagement with the stop surfaces, thereby permitting continuous rotation of the cam bodies. In one example embodiment a spring acts between the cup and the pinion to bias the cup into the first position. In another example embodiment one or more springs act between the pinion and the housing to bias the cup into the first position.

Another example embodiment further comprises a plurality of traction surfaces extending around each the cam body. Each traction surface comprises a plurality of projections extending transversely to one of the axes of rotation. A respective gap in the traction surfaces is positioned between each of the traction surfaces on each the cam body. Each gap is aligned axially with a discontinuity of the cam surface. By way of example the cam surfaces are positioned between the gear and the traction surfaces on each cam body. In a specific example embodiment the cam surfaces are positioned proximate to the traction surfaces on each the cam body. In another example embodiment, each of the cam bodies comprises at most two of the cam surfaces and two of the discontinuities. By way of further example each of the cam bodies comprises at most two of the cam surfaces, two of the discontinuities of the cam surfaces, two of the traction surfaces and two of the gaps in the traction surfaces.

The invention also encompasses a method of forming a groove in a pipe element. In one example embodiment the method comprises:

contacting the pipe element with a plurality of cam surfaces simultaneously at a plurality of locations on the pipe element;

rotating the pipe element, thereby simultaneously rotating the cam surfaces, each cam surface engaging the pipe element with an increasing radius and thereby deforming the pipe element to form the groove.

An example embodiment of the method further comprises contacting the pipe element with at least one traction surface mounted on at least one cam comprising one of the cam surfaces. Another example embodiment comprising contacting the pipe element with a plurality of traction surfaces. In this example one the traction surface is mounted on a respective one of the cams. Each of the cams comprises one of the plurality of cam surfaces.

Another example embodiment comprises synchronizing rotation of the cam surfaces with one another. A further example embodiment comprises using an actuator to initiate rotation of one of the cam surfaces.

DETAILED DESCRIPTION

Figure 1:
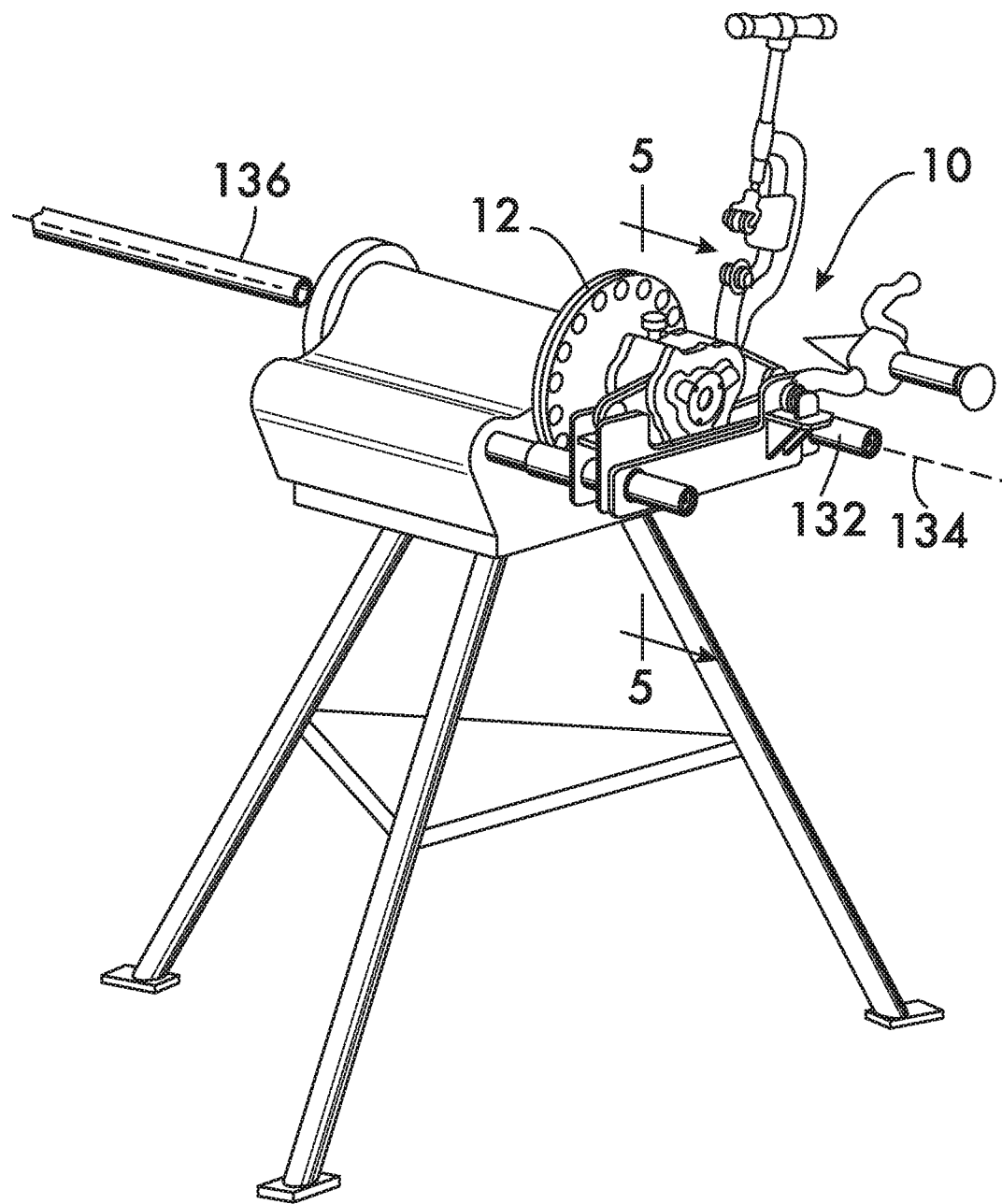
FIG. 1 is an isometric view of an example embodiment of a device according to the invention.

FIG. 1 shows an example device 10 for cold working a pipe element, for example, forming a circumferential groove in the pipe element's outer surface. Device 10 is shown pivotably mounted on a rotating power chuck 12. Such chucks are well known, an example being the Ridgid 300 Power Drive marketed by Ridgid of Elyria, Ohio.

Figure 2:
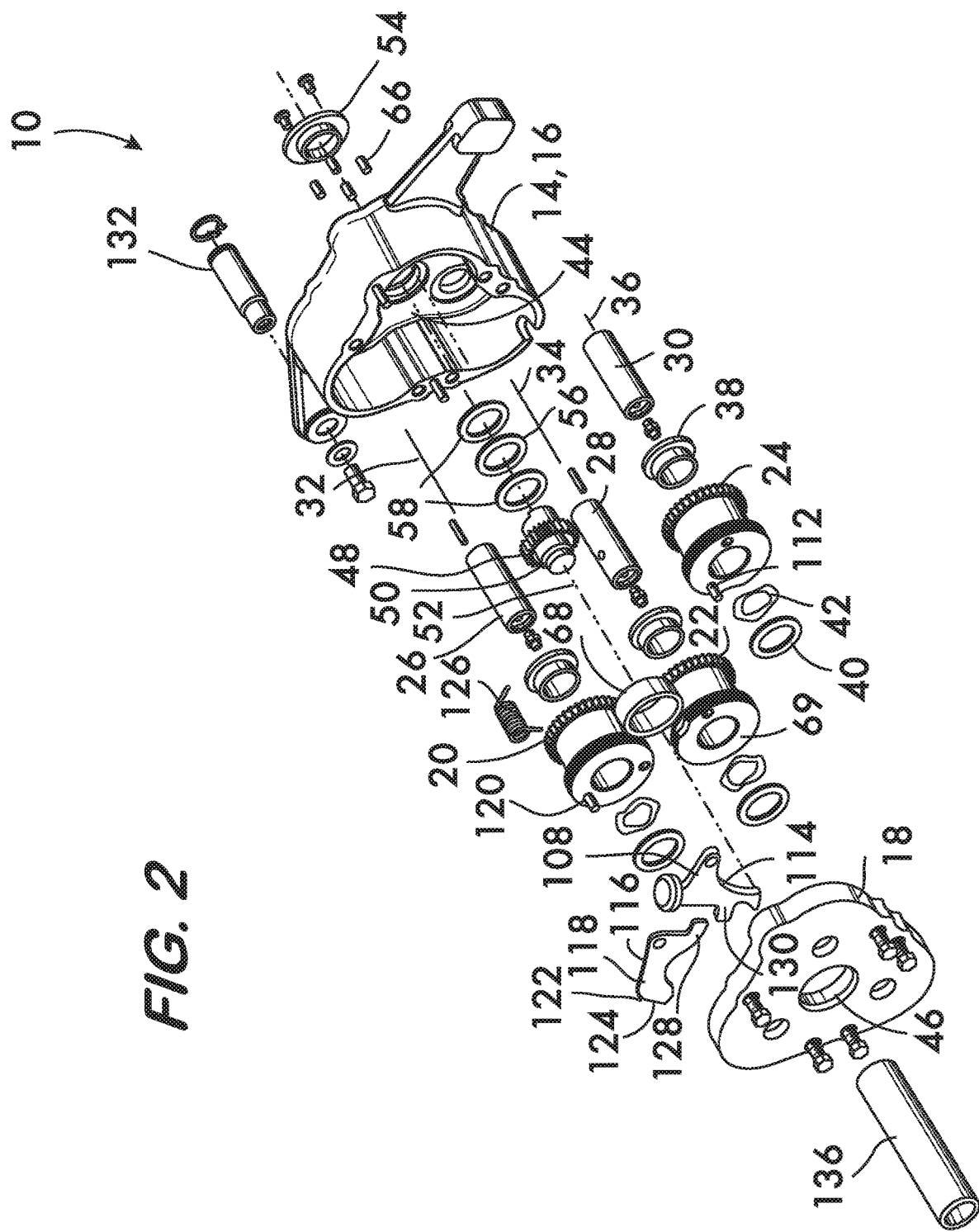
FIG. 2 is an exploded isometric view of a portion of the device shown in FIG. 1.

FIG. 2 shows an exploded view of device 10 which comprises a housing 14. Housing 14 is formed of a housing body 16 and a cover 18. A plurality of gears, in this example three gears 20, 22 and 24 are rotatably mounted on respective shafts 26, 28 and 30, the shafts being supported by the housing body 16 and cover 18 and defining respective axes of rotation 32, 34 and 36. Axes 32, 34 and 36 are arranged parallel to one another. In a practical design each gear 20, 22 and 24 has a respective flanged bushing 38, and may also have a thrust washer 40 and a compression spring 42. The compression springs 42 act between the gears 20, 22 and 24 and the cover 18 to bias the gears away from the cover.

Figure 3:
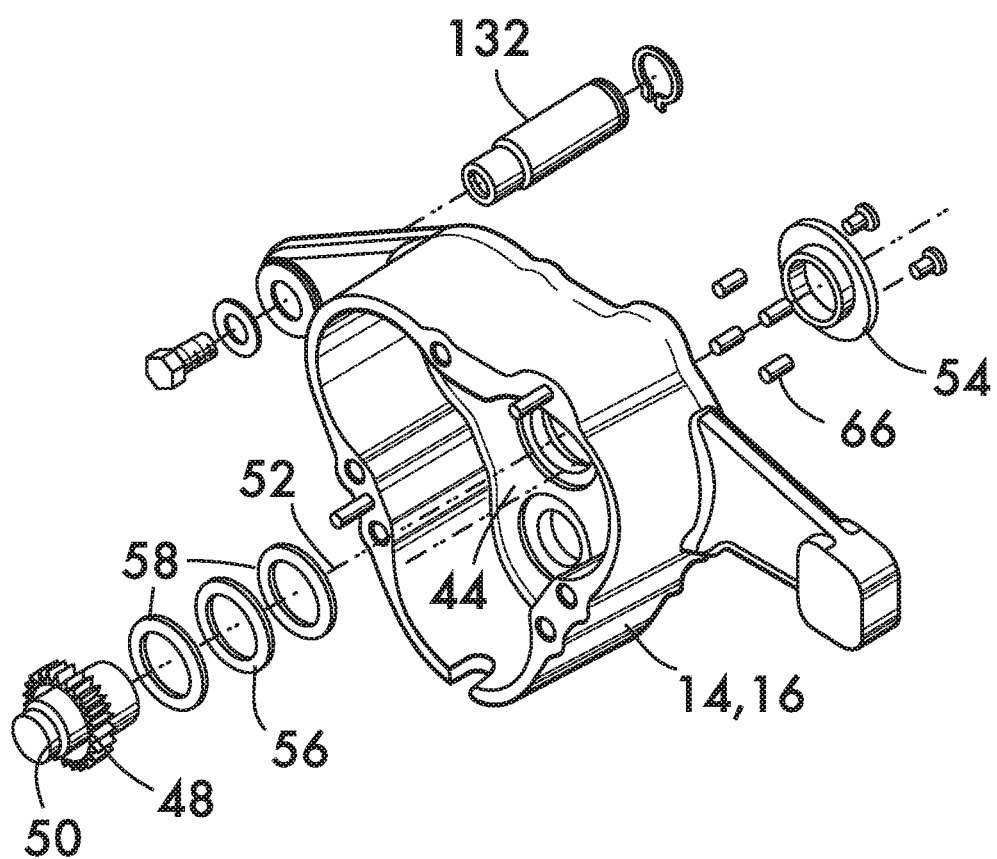
FIG. 3 is an exploded isometric view of components of the device shown in FIG. 1.
Figure 3A:
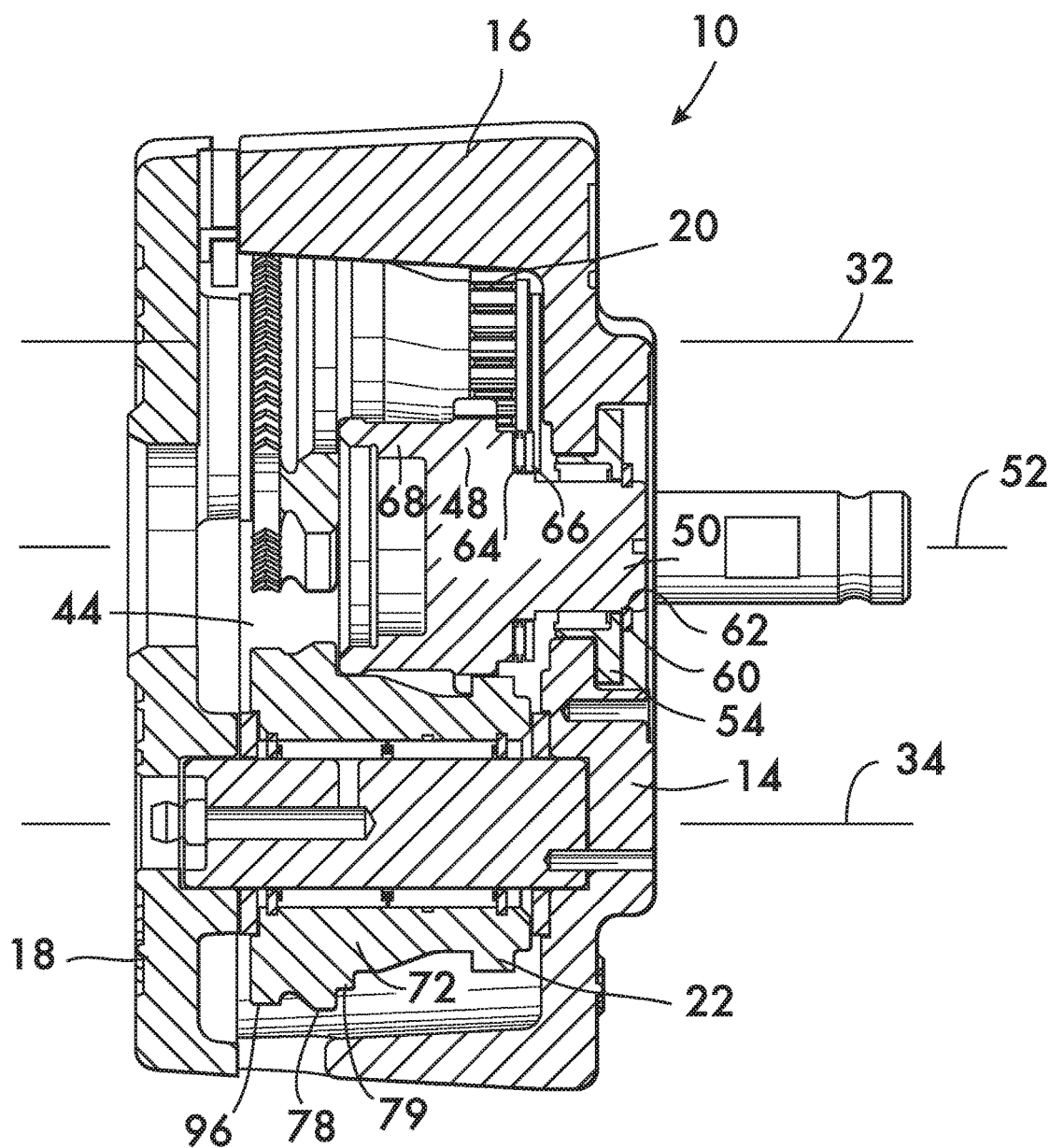
FIG. 3A is a longitudinal sectional view of the device shown in FIG. 1.

Gears 20, 22 and 24 are positioned about a central space 44 which receives a pipe element 136 to be cold worked by the device 10. An opening 46 in cover 18 provides access to the central space 44 and permits pipe element insertion into the device 10. As shown in FIGS. 2, 3 and 3A, a pinion 48 is mounted on housing body 16 within the central space 44. Pinion 48 meshes with gears 20, 22 and 24 and thus synchronizes the motion of the gears 20, 22 and 24 and their associated cam bodies as described below. In this example pinion 48 comprises a pinion shaft 50 which defines a pinion axis of rotation 52 oriented parallel to the axes 32, 34 and 36 of the gears 20, 22 and 24. Pinion shaft 50 is supported by a flanged pinion bushing 54 fixedly attached to the housing body 16. In a practical design, a thrust bearing 56 and thrust washers 58 are interposed between the pinion 48 and the housing body 16.

For ease of assembly the pinion shaft 50 in this example is retained within the housing 14 by a retaining ring 60 (see FIG. 3A) which is received within a circumferential groove 62 in the pinion shaft 50. Ring 60 engages the bushing 54 when present. One or more springs 66 may act between the housing body 16 and the thrust washer 58 (see FIG. 2) to bias the pinion toward the housing cover 18, motion in that direction being limited by the engagement between the retaining ring 60 and the bushing 54. Alternately, contact with a vertical portion of one of the cam bodies may also be used to limit pinion shaft travel (see FIG. 3A). Attaching the pinion 48 using springs 66 and retaining ring 60 allows the pinion to move relatively to housing 14 in a direction along the pinion axis 52. This axial motion of the pinion 48 is used to lock and unlock the cam bodies to permit or prevent their rotational motion as described below.

Figure 4:
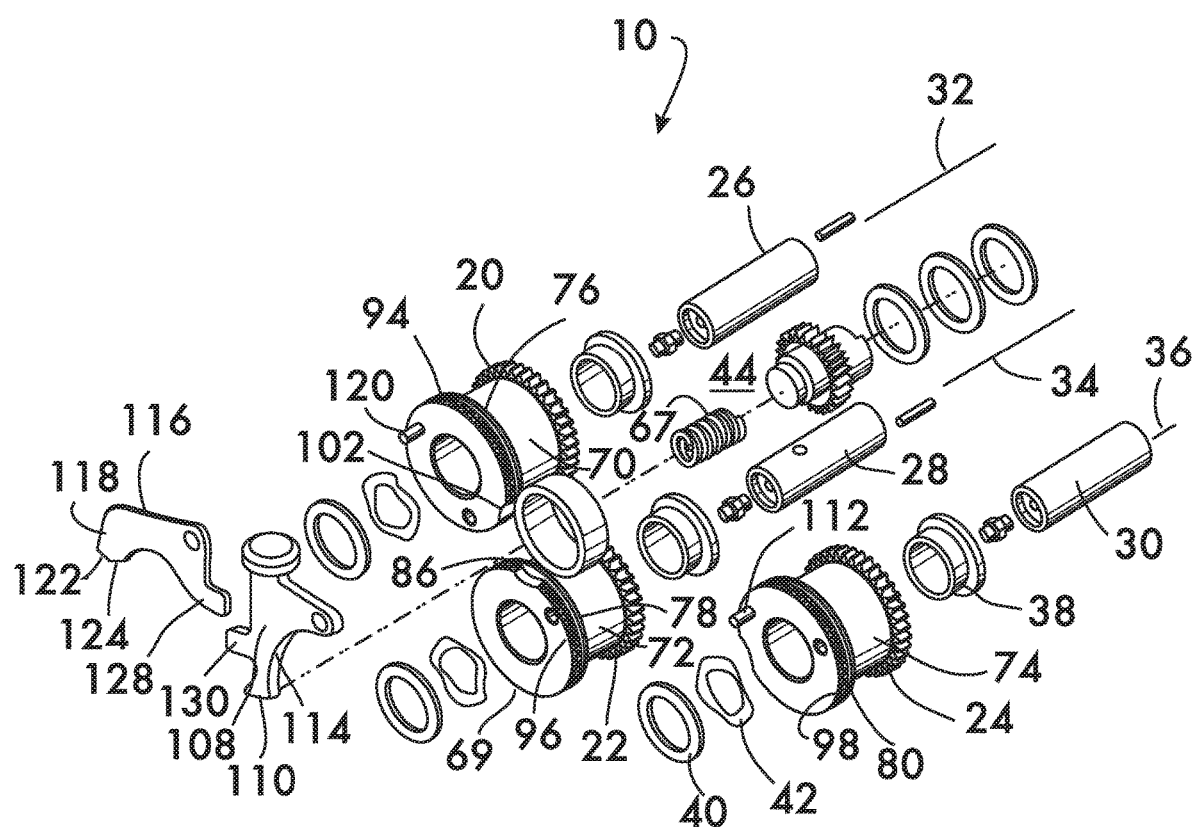
FIG. 4 is an exploded isometric view of components of the device shown in FIG. 1.

To provide contact between the pinion 48 and the pipe element, a cup 68 is positioned adjacent the pinion 48 and is captured between the cam bodies. In a practical design the cup 68 may be fixedly attached to the pinion as shown in FIG. 3A, or free-wheeling as shown in FIGS. 2 and 4. As further shown in FIG. 4, a spring 67 may be positioned between the pinion 48 and the cup 68 to bias the cup, which is movable within the housing 14 in a direction along the pinion axis 52. Axial motion of the cup 68 is used to lock and unlock the pinion to permit or prevent rotational motion of the cam bodies as described below. Cup 68 receives and maintains the pipe element in alignment with the pinion 48 so that it may be turned when cold working the pipe element as described below. Cup 68 also helps limit pipe end flare during cold working.

As shown in FIG. 4, device 10 comprises a plurality of cams 69, in this example, three cams having respective cam bodies 70, 72 and 74. Each cam body 70, 72 and 74 is mounted on a respective gear 20, 22 and 24. Each cam body 70, 72 and 74 comprises a respective cam surface 76, 78 and 80. Each cam surface 76, 78 and 80 extends around their respective cam body 70, 72 and 74. The cam surfaces 76, 78 and 80 are engageable with a pipe element received within the central space 44.

Figure 4A:
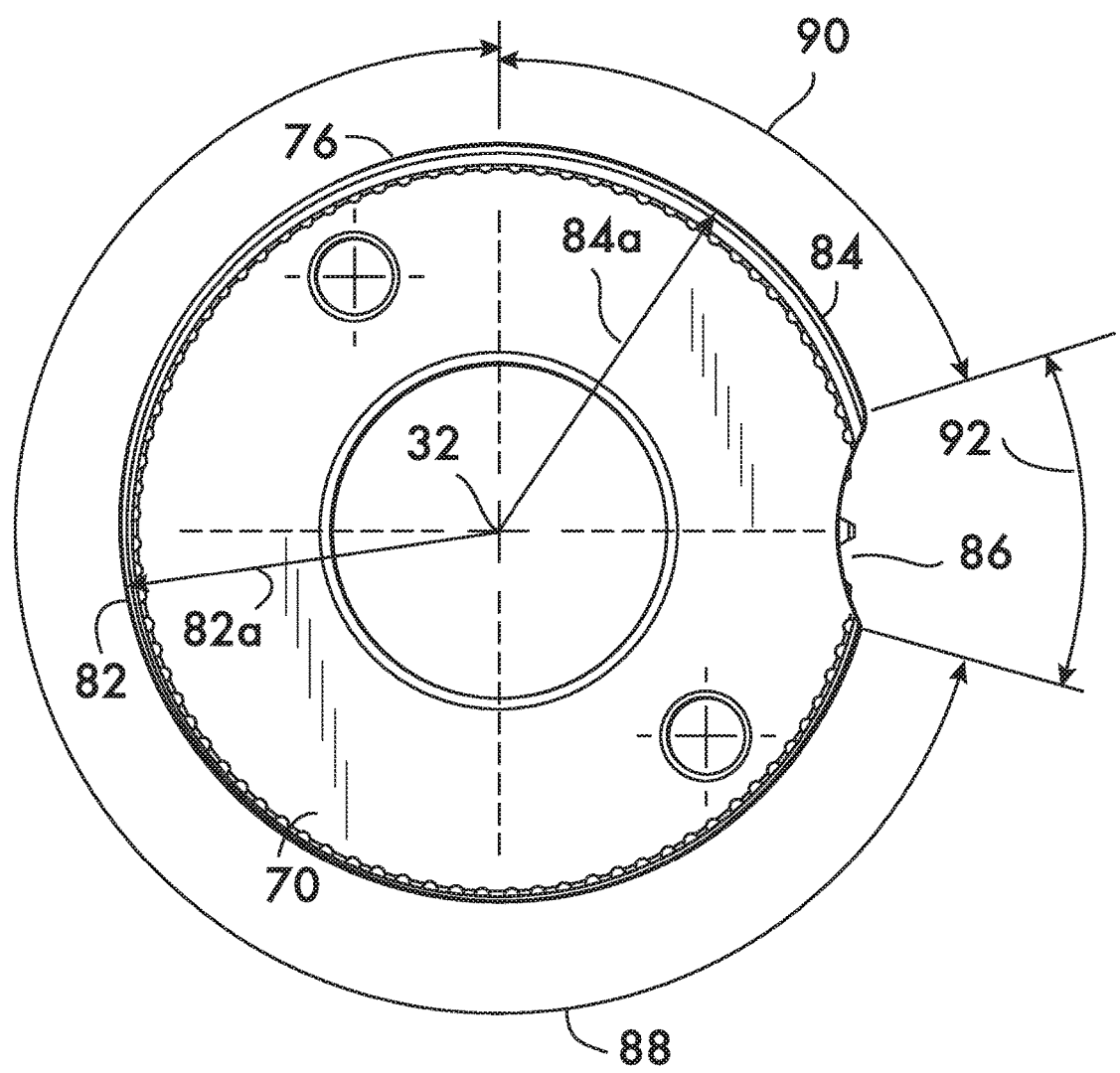
FIG. 4A is an end view of an example cam according to the invention.
Figure 5:
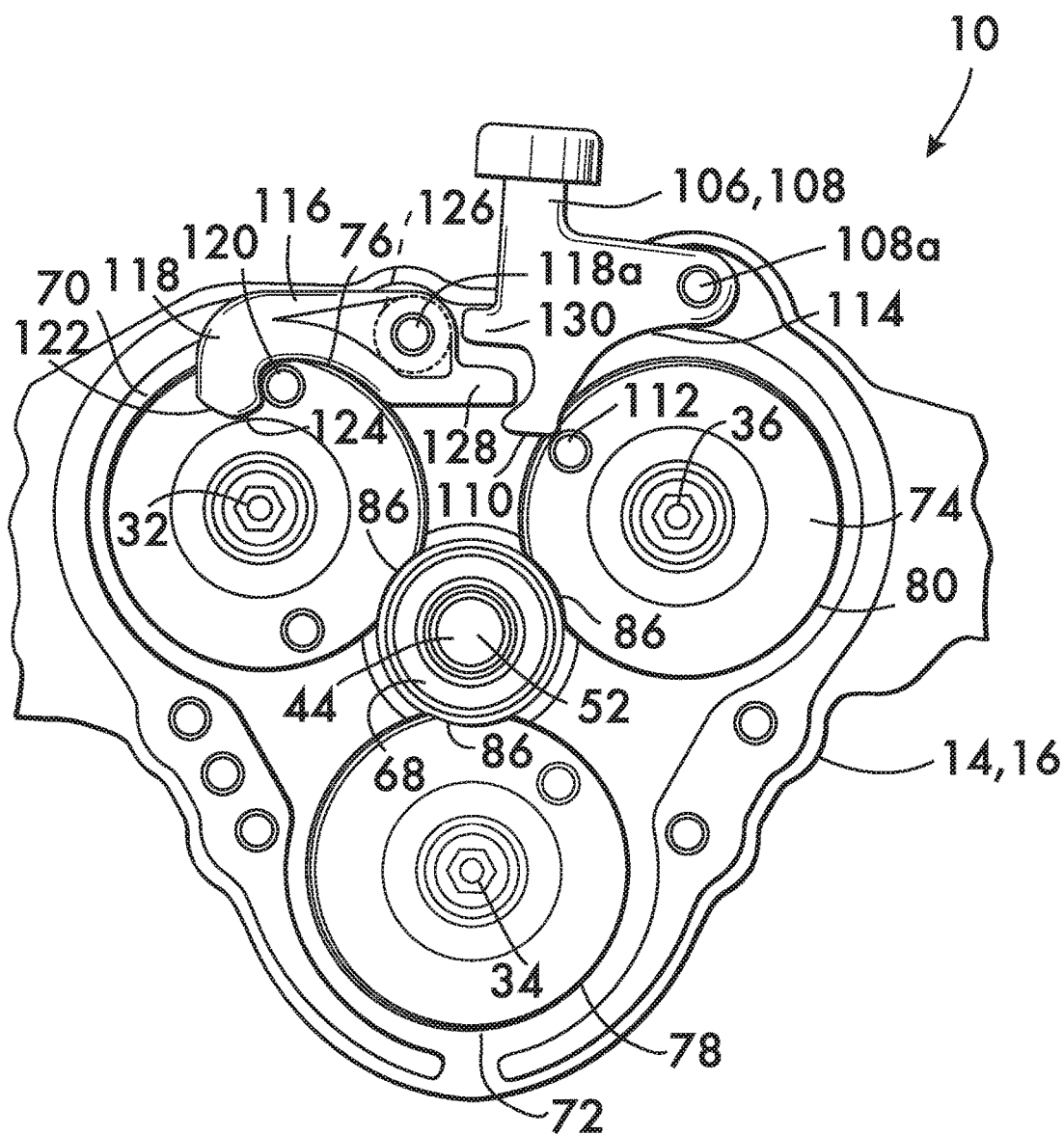
FIG. 5 is a cross sectional view of device 10 taken at line 5-5 of FIG. 1.

As shown in detail in FIG. 4A, each one of the cam surfaces 76, 78, 80 (76 shown) comprises a region 82 of increasing radius 82a and a discontinuity 86. Each one of the cam surfaces may also include a region 84 of constant radius 84a positioned adjacent to the discontinuity 86. The radii 82a and 84a (when present) are measured about and from the respective axes of rotation 32, 34 and 36 of the gears 20, 22 and 24 (shown for the cam surface 76, the axis 32 of gear 20). As shown in FIG. 5, the discontinuities 86, when facing the central space, provide clearance permitting insertion of the pipe element into the cup 68. With reference again to FIG. 4A, the example device 10 has three cam bodies 70, 72 and 74. The regions of constant radius 84 extend along an arc length which is at least ⅓ of the circumference of the finished circumferential groove in the pipe element so that the groove may be formed to a uniform radius around the entire circumference of the pipe element during one revolution of each cam body 72, 74 and 76. In an example practical design (see FIG. 4A), the region of increasing radius 82 may subtend an angle 88 of approximately 260°, and the region of constant radius (when present) may subtend an angle 90 of approximately 78°, the discontinuity 86 subtending an angle 92 of approximately 22°. For devices 10 having a number of cams other than three and the constraint that the groove be formed to a uniform radius around the entire circumference of the pipe element in one revolution of each of the cams, the arc length of the region of constant radius of each cam body is advantageously 1/N, where "N" is the number of cams in the design. However, it is feasible to reduce or eliminate entirely the region of constant radius. Elimination of this region will reduce the torque required to form the groove.

Figure 4B:
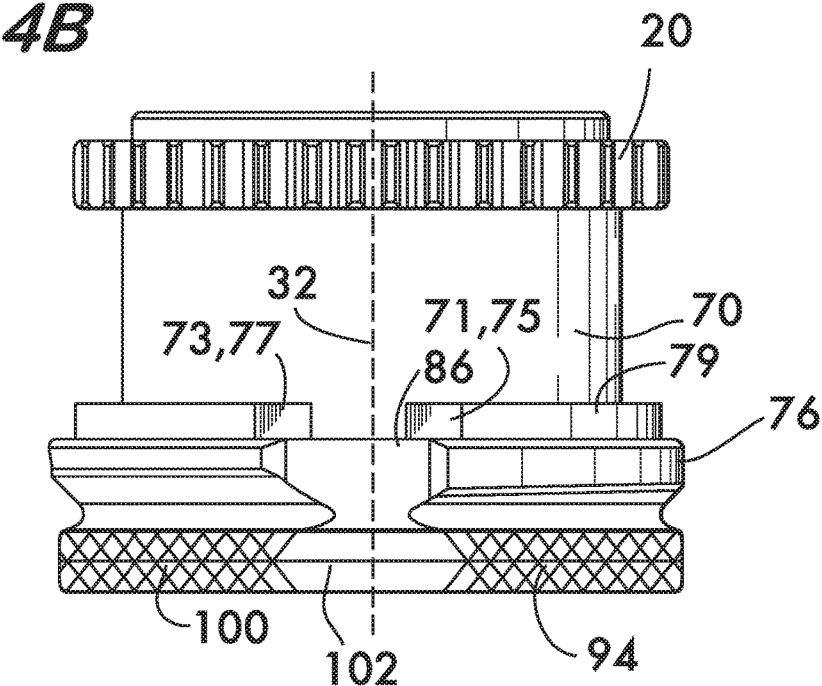
FIG. 4B is a side view of an example cam according to the invention.
Figure 4D:
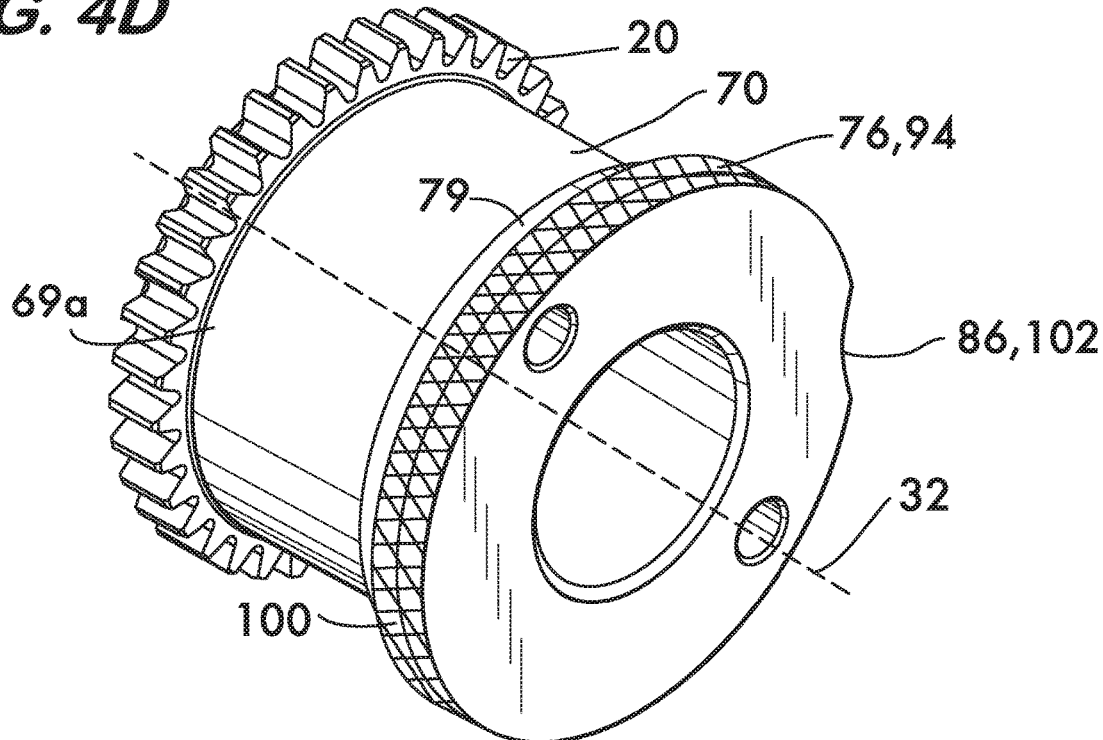
FIG. 4D is an isometric view of an example cam according to the invention.

As shown in FIGS. 4 and 4B, it is advantageous to include at least one traction surface 94 on one of the cam bodies such as 70. In the example device 10 each cam body 70, 72 and 74 has a respective traction surface 94, 96 and 98. The traction surfaces 94, 96 and 98 extend circumferentially around their respective cam bodies 70, 72 and 74 and have a constant radius measured about and from the respective axes of rotation 32, 34 and 36. The cam surfaces 76, 78, 80, are positioned between the gears 20, 22 and 24 and the traction surfaces 94, 96 and 98, the cam surfaces being positioned proximate to the traction surfaces. As shown in FIG. 4B, each traction surface (94 shown) comprises a plurality of projections 100 which extend transversely to the respective axes of rotation 32, 34 and 36. Projections 100 provide mechanical engagement and purchase between the cam bodies 70, 72 and 74 and the pipe element which the traction surfaces engage. Each traction surface 94, 96 and 98 also has a gap 102. Each gap 102 in each traction surface 94, 96 and 98 substantially aligns axially with a respective discontinuity 86 in each cam surface 76, 78, 80 to provide clearance permitting insertion and withdrawal of the pipe element into and from the cup 68. In another cam embodiment 69a, shown in FIG. 4D, the traction surface 94 overlies the cam surface 76. The gap 102 in the traction surface 94 is again aligned with the discontinuity 86 in the cam surface 76.

Figure 4C:
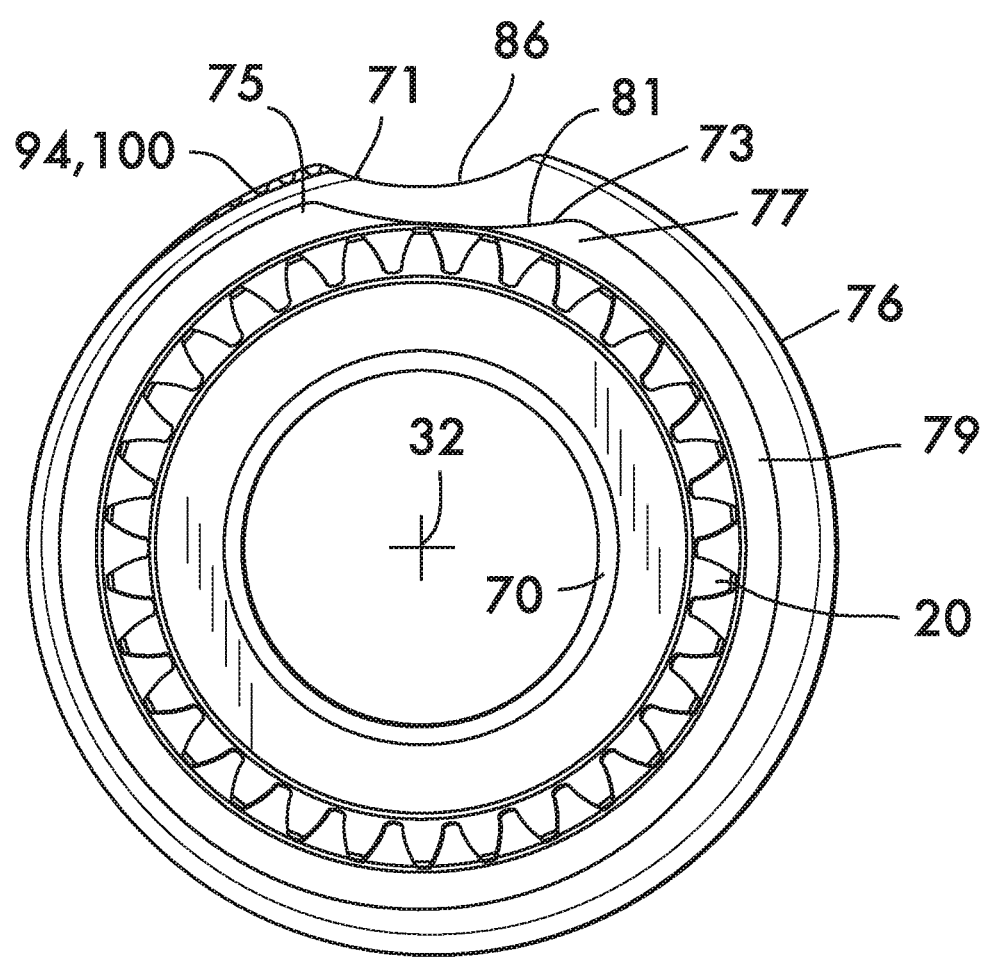
FIG. 4C is an end view of an example cam according to the invention.

As shown in FIGS. 4B and 4C, one or more stop surfaces 71, 73 project from at least one of the cam bodies (70 shown). First and second stop surfaces 71 and 73 project transversely to the cam body axis of rotation 32 and are positioned adjacent to the discontinuity 86 of the cam surface 76. In the practical example shown in FIGS. 4B and 4C, the stop surfaces 71 and 73 are positioned on the first and second ends 75, 77 of a rib 79. Rib 79 extends circumferentially around the cam body 70 between the gear 20 and the cam surface 76. Stop surfaces 71 and 73 may have concave curvature 81 as shown in FIG. 4C to better cooperate with cup 68 during operation of the device 10 as described below. While the stop surfaces 71, 73 are illustrated and described for cam body 70, it is understood that the same stop surfaces may also be present on cam bodies 72 and 74 as well.

As shown in FIG. 5, it is further advantageous to include an actuator 106 to initiate motion of the cam bodies 70, 72 and 74. In this example embodiment, actuator 106 comprises an actuator lever 108 pivotably mounted on the housing body 16. Actuator lever 108 has a first surface 110 which engages a finger 112 on cam body 74 to initiate rotation of the cam body. Finger 112 is offset from the axis of rotation 36 of cam body 74 and extends from cam body 74 in a direction parallel to the axis 36 (see also FIG. 2). The offset of finger 112 allows the actuator lever 108, when pivoted about its pivot axis 108a (aligned parallel to the pinion axis 52), to apply a torque to the cam body 74 (gear 24) and rotate it about axis 36. This rotates all of the cam bodies 70, 72 and 74 because their respective gears 20, 22 and 24 mesh with the pinion 48 which provides a synchronization function, thus the act of turning any one gear or turning the pinion turns all gears. Actuator lever 108 also has a second surface 114 which is engaged by the finger 112 as the cam body 74 rotates. The second surface 114 is curved in this example and allows the rotating cam body 74 to reset the relative positions of the finger 112 and the actuator lever 108 so that upon one rotation of the cam body 74 the actuator lever 108 is pivoted to a "ready" position as shown in FIG. 6, ready to apply a torque to the cam body and initiate rotation.

It is further advantageous to include a stop 116, movably mounted on housing body 16 to prevent motion of the cam bodies. In this example embodiment, stop 116 comprises a hook 118 pivotably mounted on the housing body 16 with a pivot axis 118a aligned parallel to the pinion axis 52. Hook 118 engages a finger 120 on cam body 70 (gear 20). Finger 120 is offset from the axis of rotation 32 of cam body 70 and extends from cam body 70 in a direction parallel to the axis 32 (see also FIG. 2). The offset allows the hook 118 to arrest counter clockwise motion of cam body 70 as described below. Tangent surfaces 122 and 124 are positioned at the end of hook 118 for engagement with finger 120 during operation of the device as described below. A torsion spring 126 (see also FIG. 2) acts between the hook 118 and the housing body 16 to bias the hook in a counter clockwise direction around pivot axis 118a. Hook 118 also has a spur 128 which extends to the opposite side of the pivot axis 118a from the hook (see also FIGS. 2 and 4). Actuator lever 108 has a foot 130 which engages spur 128 to pivot the hook 118 out of engagement with finger 120 upon movement of the actuator lever 108 into engagement with the finger 112, forcing the cam 74 counterclockwise to initiate motion of the cam bodies 70, 72 and 74 as described below.

Figure 6:
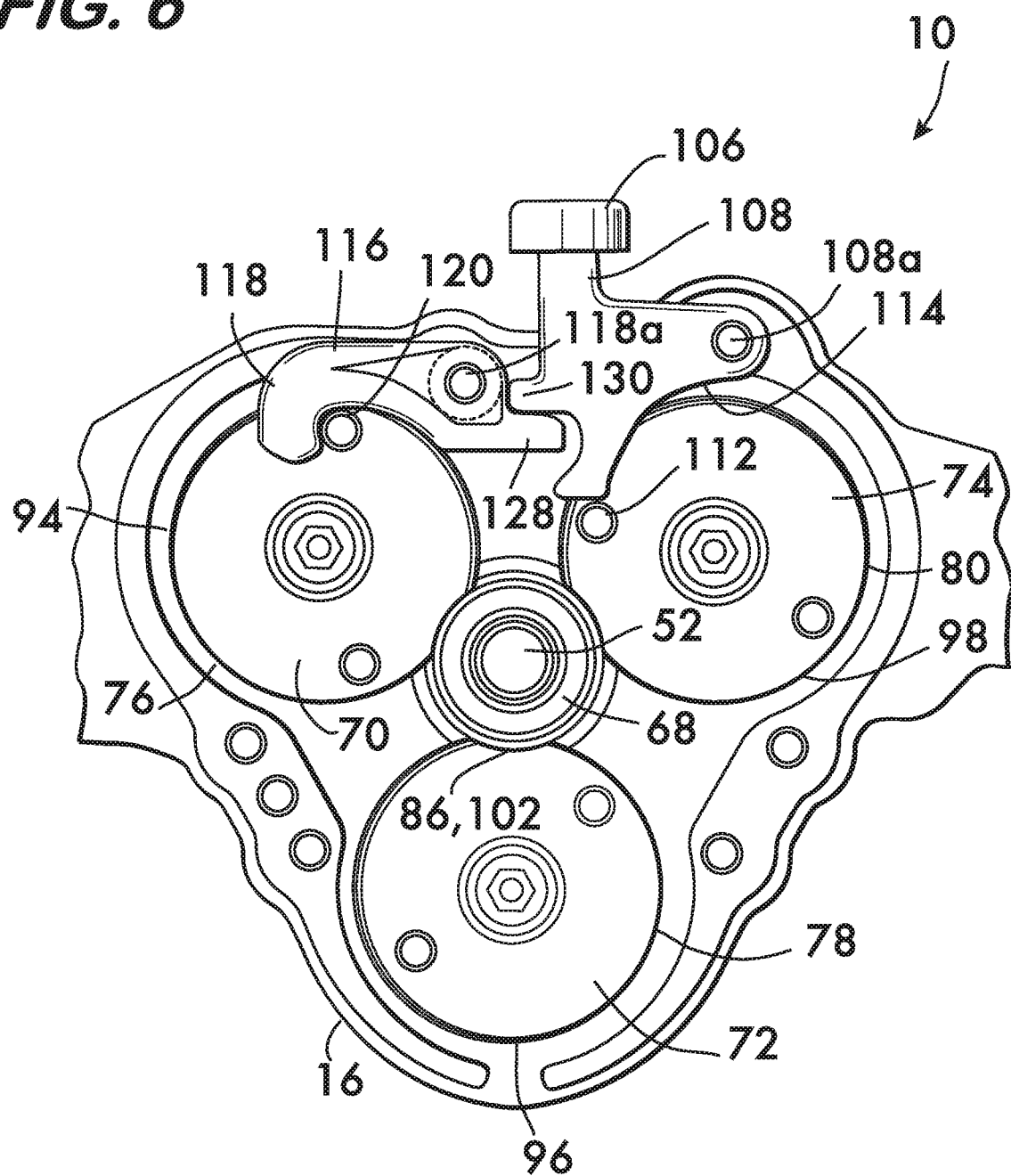
FIGS. 6 through 9 and 9A are additional cross sectional views illustrating operation of device 10.
Figure 6A:
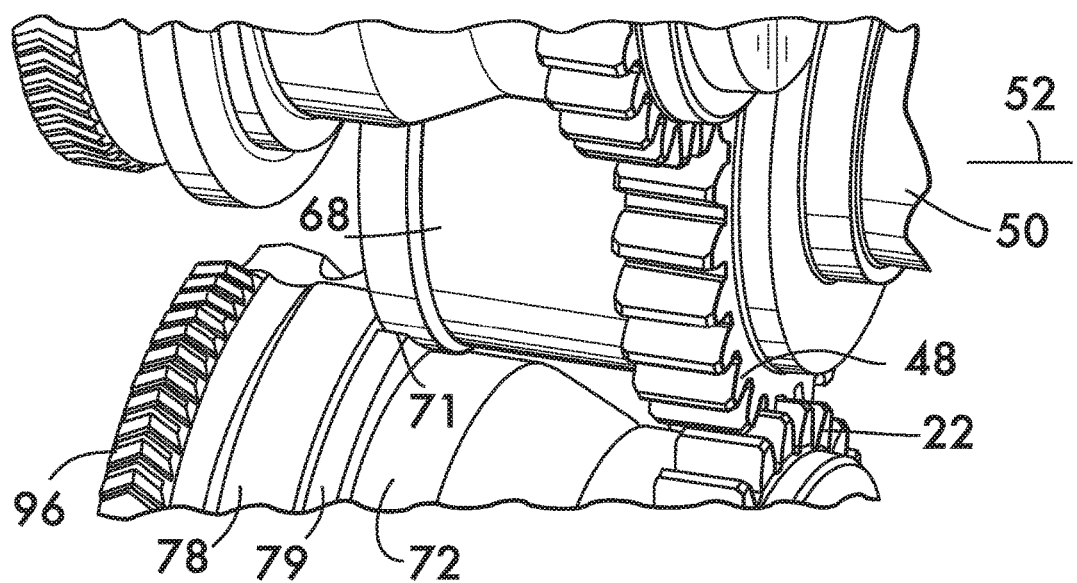
FIGS. 6A and 6B are isometric views of a portion of the device shown in FIG. 1 illustrating operation of the stop surfaces on the cams.

Operation of device 10 begins with the cam bodies 70, 72 and 74 aligned as shown in FIG. 6 such that the discontinuities 86 in the cam surfaces 76, 78 and 80 (see also FIG. 4) and gaps 102 in the traction surfaces 94, 96 and 98 simultaneously face the pinion axis 52. As further shown in FIG. 6A, cup 68 is biased axially, either by springs 66 (see FIG. 3A) or spring 67 (see FIG. 4) into a first position wherein the cup engages the first stop surface 71 on cam body 72. When cup 68 is in this position the cam bodies 70, 72 and 74 are prevented from rotating about their respective axes 32, 34 and 36. As shown in FIG. 1, device 10 is mounted on tubes 132 extending from one end of the rotating chuck 12. The opening 46 in housing cover 18 faces the chuck 12 (see FIG. 2). Pinion axis 52 is coaxially aligned with the axis of rotation 134 of chuck 12. A pipe element 136 is inserted into the opposite end of the chuck 12 so that the end of the pipe element extends outwardly from the chuck toward device 10. Chuck 12 is tightened to secure the pipe element and the device 10 is then moved along tubes 132 toward and into engagement with the pipe element.

Figure 6B:
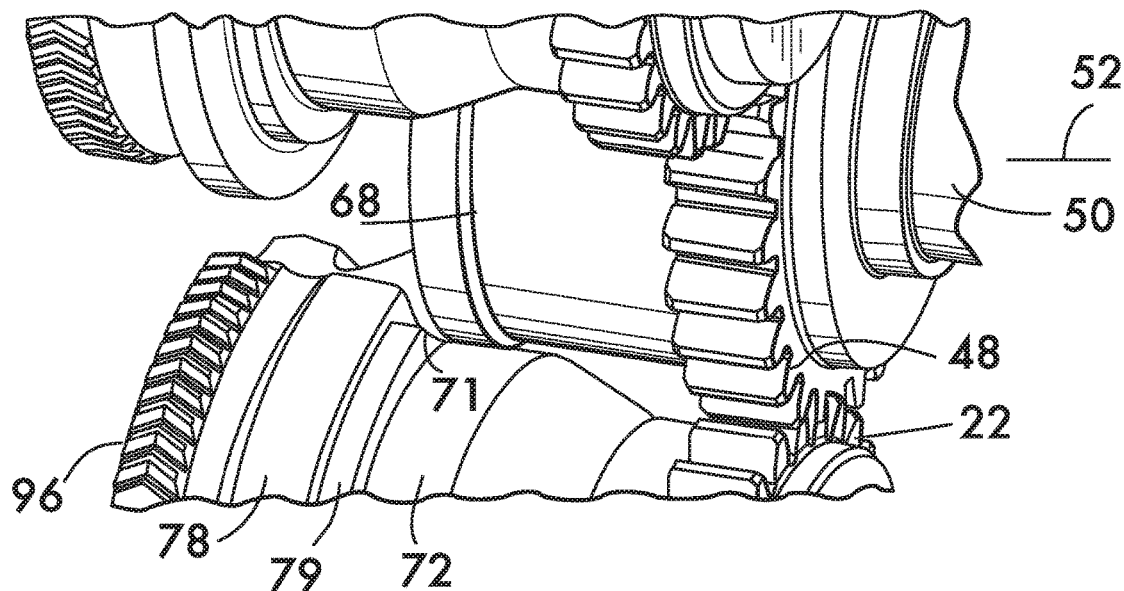

With reference to FIGS. 2 and 4, the pipe element passes through opening 46 and into the central space 44. Aligned discontinuities 86 and gaps 102 provide the clearance necessary to permit the pipe element to pass by cam surfaces 76, 78 and 80 and traction surfaces 94, 96 and 98 to be received in the cup 68. The pipe element is thus aligned with the pinion axis 52. Device 10 is moved further toward chuck 12 (see FIG. 1) so as to cause the cup 68 to move axially along the pinion axis 52 and compress springs 66 (see FIG. 2) or spring 67 (see FIG. 4) sufficiently to move cup 68 into the second position shown in FIG. 6B where the cup is not engaged with the stop surface 71 on cam body 72 or any other cam body. When cup 68 is in this second position, rotation of the cam bodies 70, 72 and 74 is permitted. The chuck 12 is then actuated, which rotates the pipe element clockwise as viewed in FIGS. 5 and 6. Alternately, rotation of the pipe element can be initiated and then the device 10 can be slid into engagement with the pipe element.

Engagement between the pipe element and the cup 68, when the cup is not fixed to the pinion, may cause the cup to rotate clockwise with the pipe. When the cup 68 is freewheeling relative to the pinion 48, the torque transmitted via friction between the cup 68 and the pinion 48 may try to rotate the pinion, and consequently gears 20, 22 and 24. Motion of the gears is easily prevented by engagement between the hook 118 and the finger 120 extending from cam body 70 (gear 20). There is furthermore no significant engagement between the pipe element and the cam bodies because the discontinuities 86 in the cam surfaces 76, 78 and 80 (see also FIG. 4) and gaps 102 in the traction surfaces 94, 96 and 98 simultaneously face the pinion axis 52 and do not significantly contact the pipe at this time. If the cup 68 is fixedly attached to the pinion 48 then engagement between hook 118 and finger 120 again prevents motion of the gears and pinion, the pipe element merely rotates within the cup.

Figure 7:
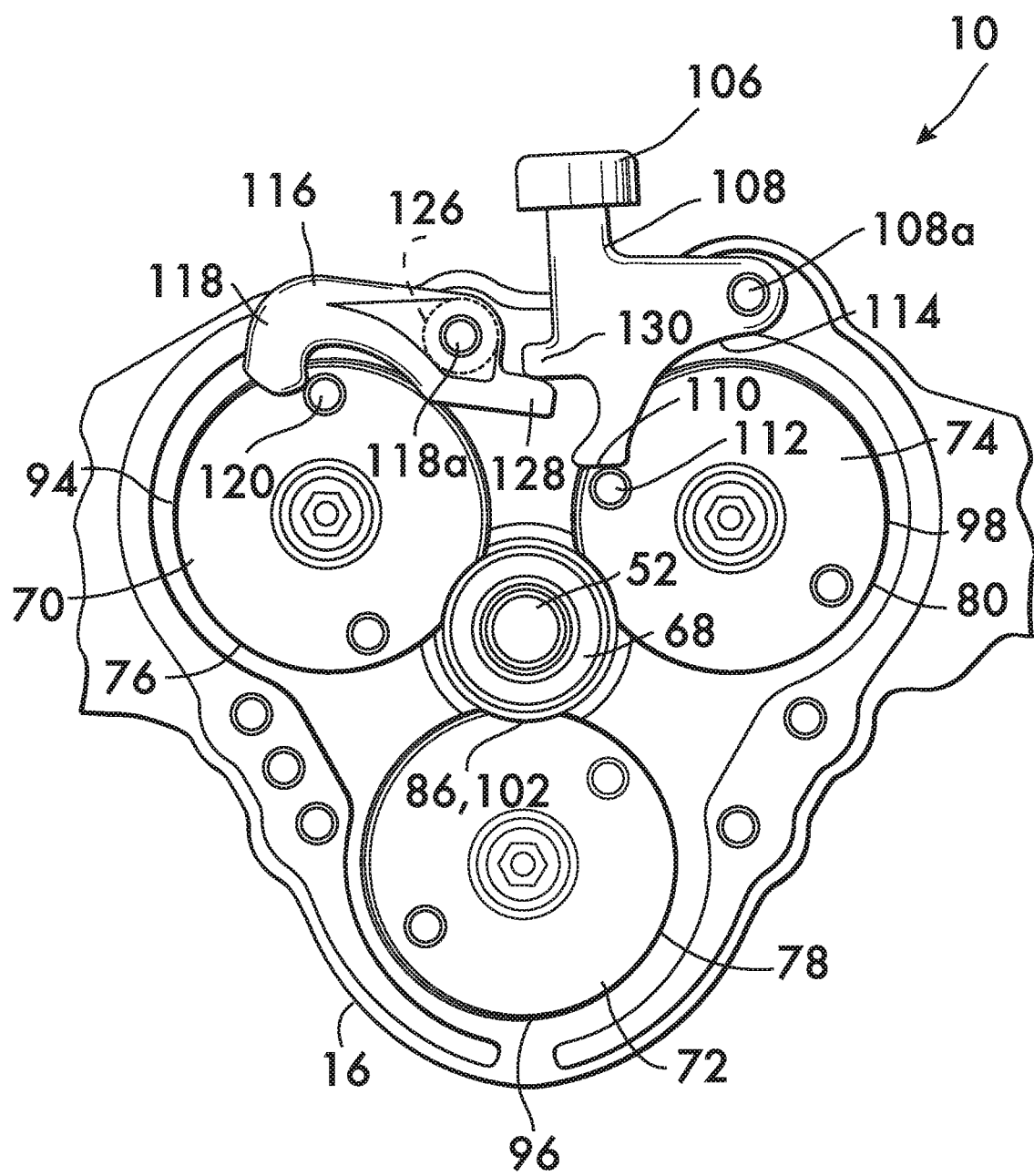
Figure 8:
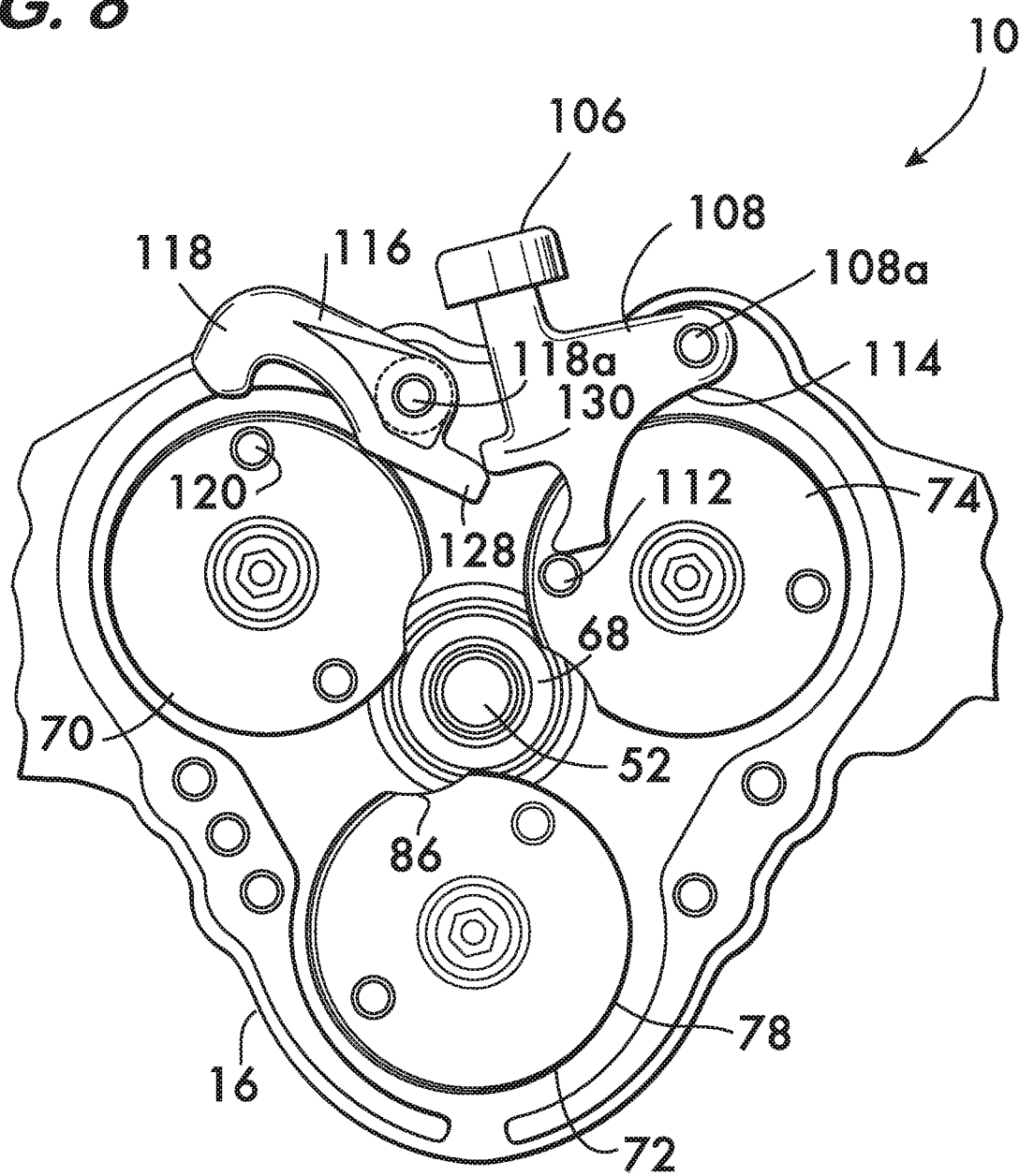

To initiate gear and cam body rotation, actuator lever 108 is depressed, causing it to pivot counterclockwise about its axis 108a as viewed in FIG. 6. As shown in FIG. 7, pivoting of actuator lever 108 causes its first surface 110 to engage the finger 112 extending from cam body 74, and also causes the foot 130 to engage the spur 128 of the hook 118. Hook 118 pivots clockwise about its axis 118a and winds its biasing spring 126 (see also FIG. 2). The geometry of the actuator lever 108, hook 118 and its spur 128 is designed such that finger 120 on cam body 70 is released from the hook 118 as torque is applied to rotate cam body 74 via engagement of the first surface 110 of actuator lever 108 with finger 112. FIG. 7 shows finger 120 on the verge of release from hook 118 and cam body 74 just before engagement with the pipe element. As shown in FIGS. 8 and 4, further pivoting of the actuator lever 108 pivots the hook 118 and releases the finger 120 from hook, (thereby permitting motion of the gear 20) while applying torque to the cam body 74 (gear 24) to initiate rotation of the pinion 48 and gears 20, 22 and 24 and their associated cam bodies 70, 72 and 74. The cam bodies rotate counter clockwise and their cam surfaces 76, 78 and 80 and traction surfaces 94, 96 and 98 engage the outer surface of the pipe element. The cam bodies 70, 72 and 74 are then driven by the rotating pipe element. The regions of increasing radius 82 (see FIG. 4A) of the cam surfaces 76, 78 and 80 first engage the pipe element and begin to form a circumferential groove in it as the cam bodies 70, 72 and 74 rotate. The traction surfaces 94, 96 and 98 (see FIG. 4B) also engage the pipe element and provide mechanical engagement which prevents slippage between the cam surfaces 76, 78 and 80 and the pipe element. As the radius at the point of contact between the cam surfaces and the pipe element increases, the groove radius is made smaller until the point of contact transitions to the region of constant radius 84 (FIG. 4A) of each cam surface 76, 78 and 80. For a device 10 having three cam bodies with respective regions of constant radius, each region of constant radius 84 extends over at least ⅓ of the circumference of the finished circumferential groove in the pipe element. The radius of the region of constant radius is designed to impart the final desired groove radius to the circumferential groove in the pipe element at a uniform radius around the entire circumference of the pipe element with one revolution of all three cam bodies. Alternately, when the regions of constant radius are not present on the cams, the groove radius is not uniform, but form separate partial spirals, one for each cam. Although not uniform, the radius of the groove falls within the necessary tolerances for the groove's intended use.

Figure 9:
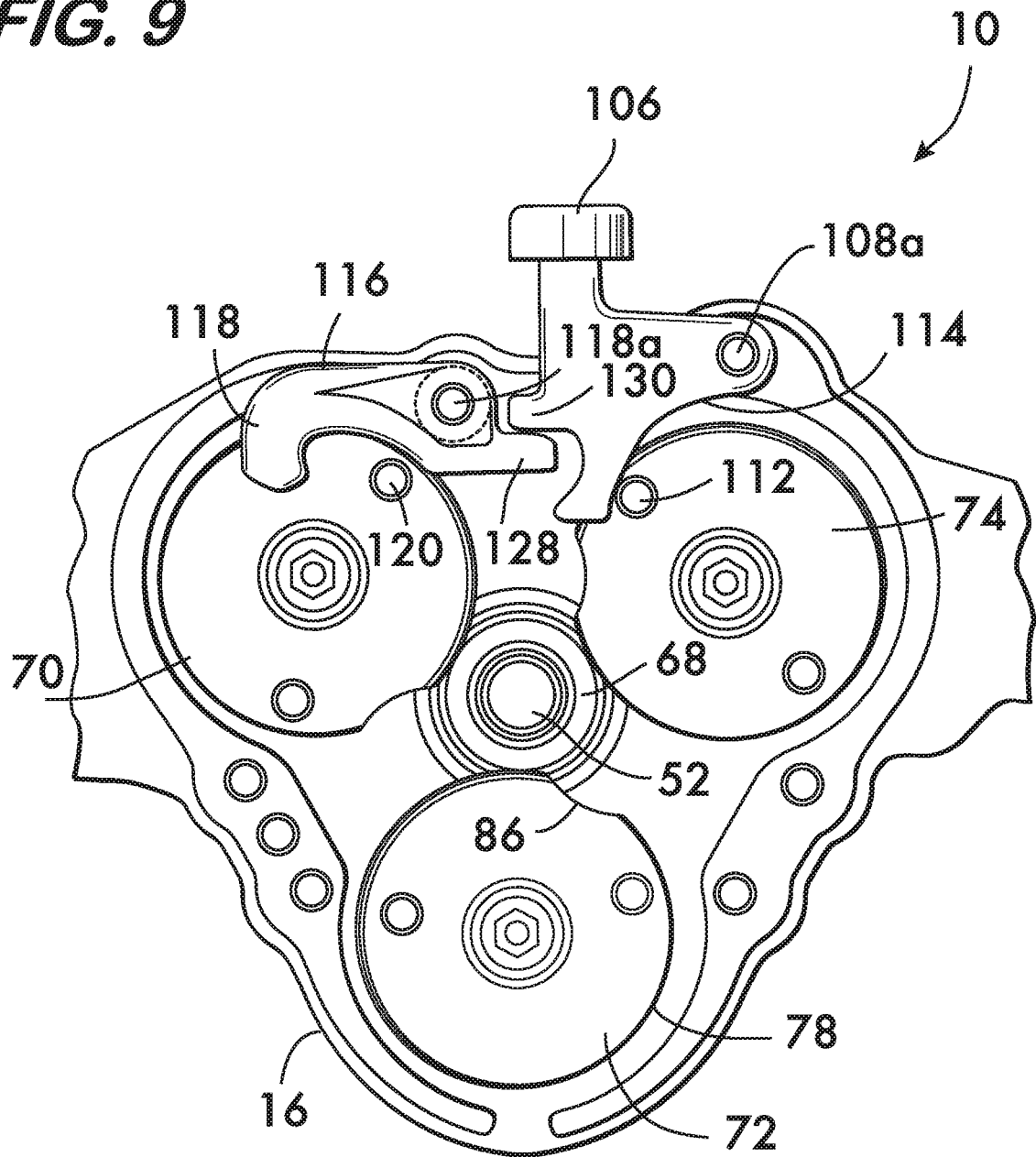
Figure 9A:
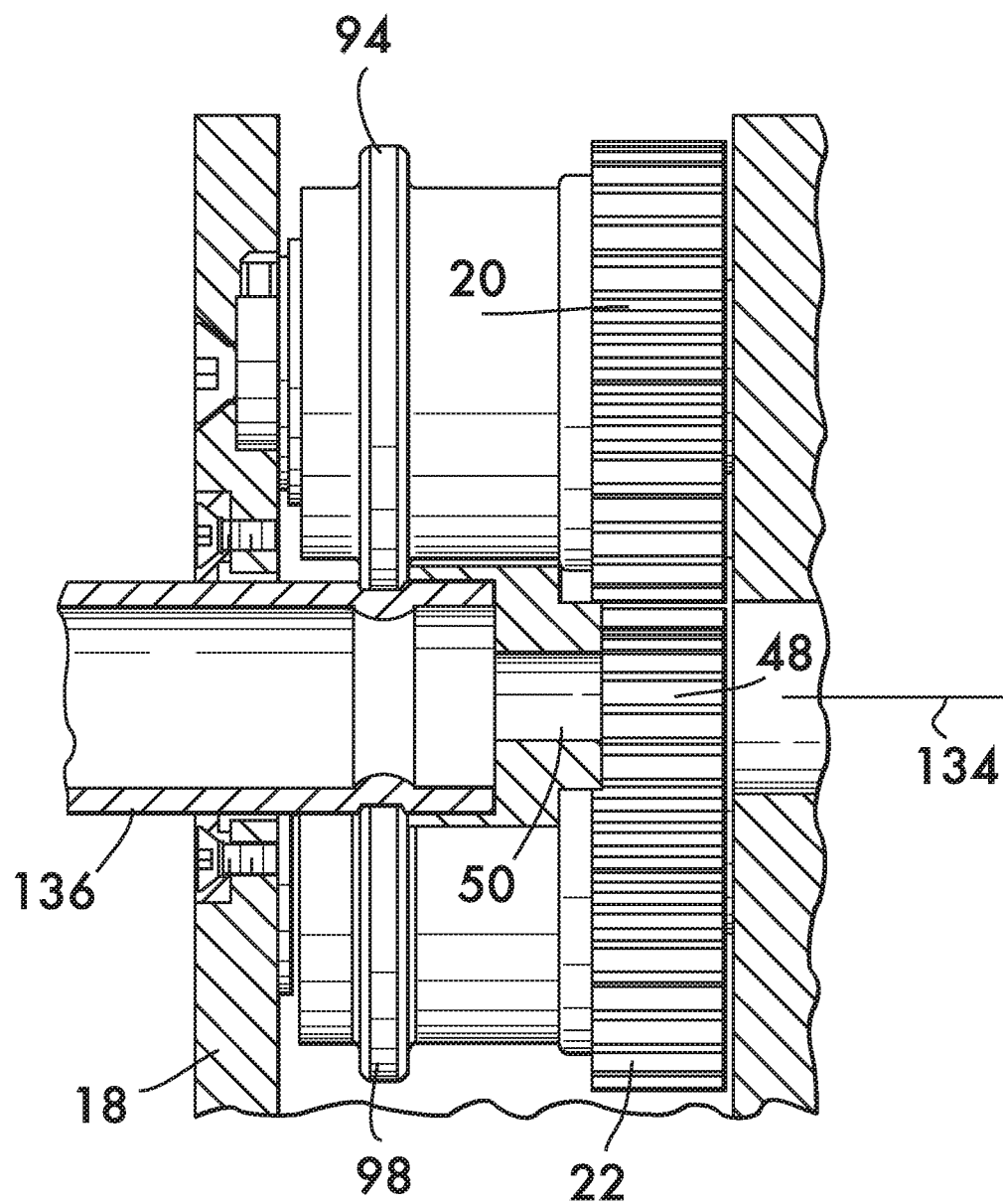

As shown in FIGS. 9 and 9A, cam body 74 nears completion of its single revolution and the finger 112 contacts the second (curved) surface 114 of the actuator lever 108. Interaction between finger 112 and surface 114 causes the actuator lever 108 to pivot clockwise about its pivot axis 108a and return to the starting position shown in FIG. 6. Hook 118 follows, biased by the spring 126 to pivot counterclockwise into a position ready to receive the finger 120. When continued rotation of cam body 70 occurs it moves finger 120 into hook 118 which stops motion of the gears 20, 22 and 24. It is also feasible to design spring 126 to have sufficient stiffness such that it will pivot both the hook 118 and the actuator lever 108 back into the start position shown in FIG. 6 when the actuator lever is released. Upon completion of groove formation the chuck 12 is stopped and the pipe element, now grooved, may be removed from device 10. Cup 68, biased either by springs 66 (see FIG. 2) or spring 67 (see FIG. 4) moves axially into the first position (see FIG. 6A) where it is in engagement with one or more of the stop surfaces 71.

Figure 10:
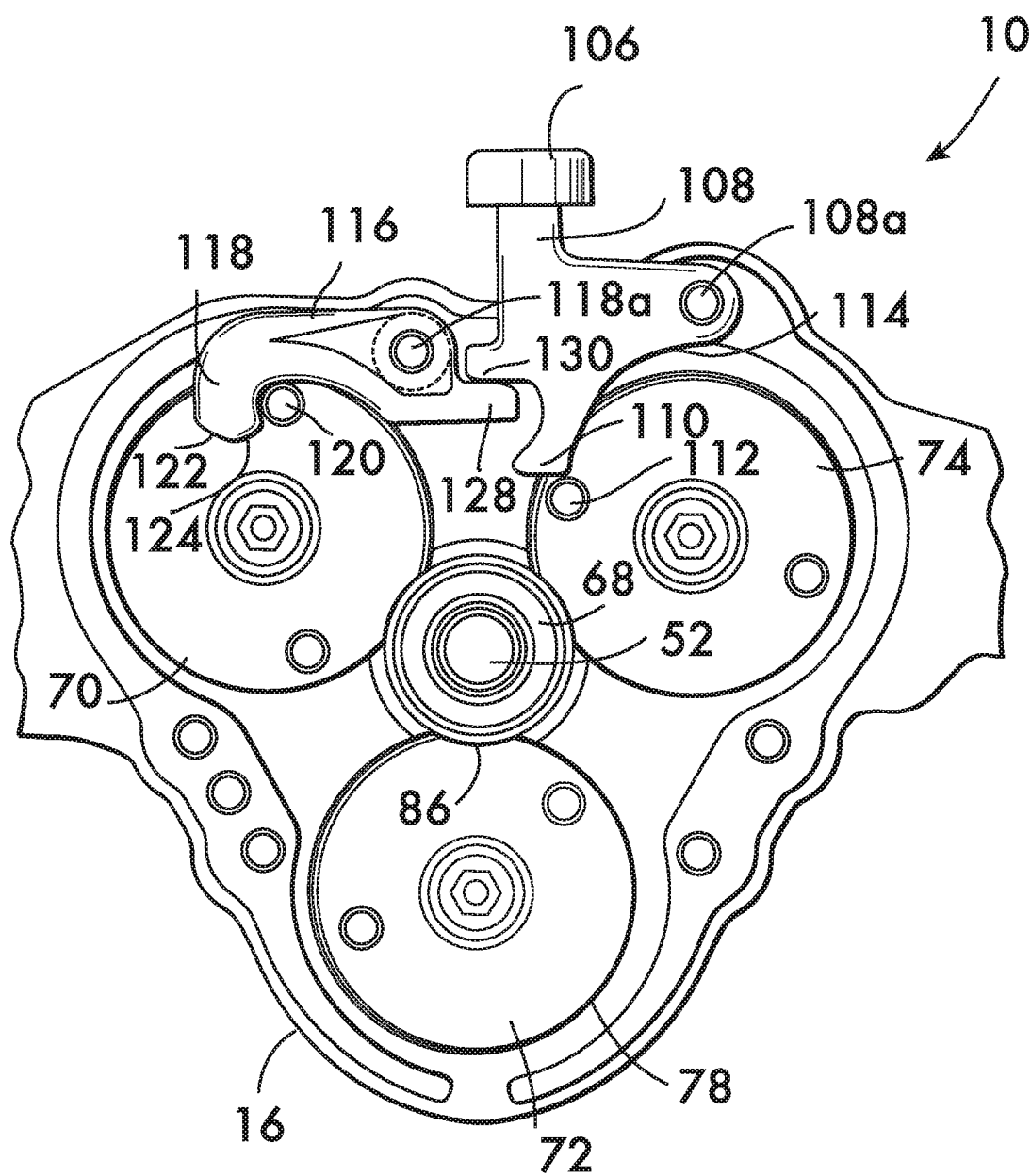
FIGS. 10-12 are cross sectional views illustrating a safe reverse mode of the device 10 when a pipe element is rotated in the wrong direction.
Figure 11:
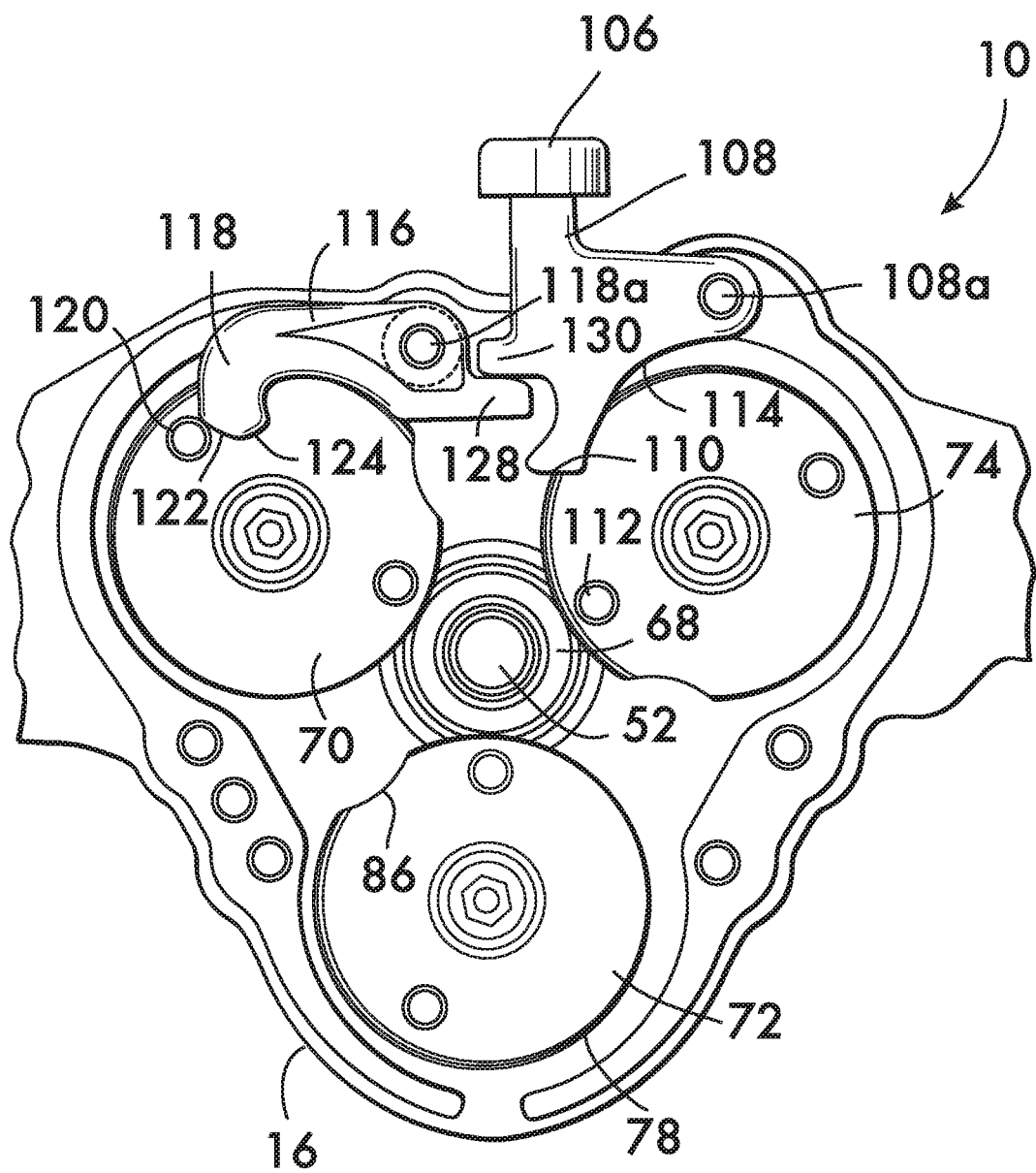
Figure 12:
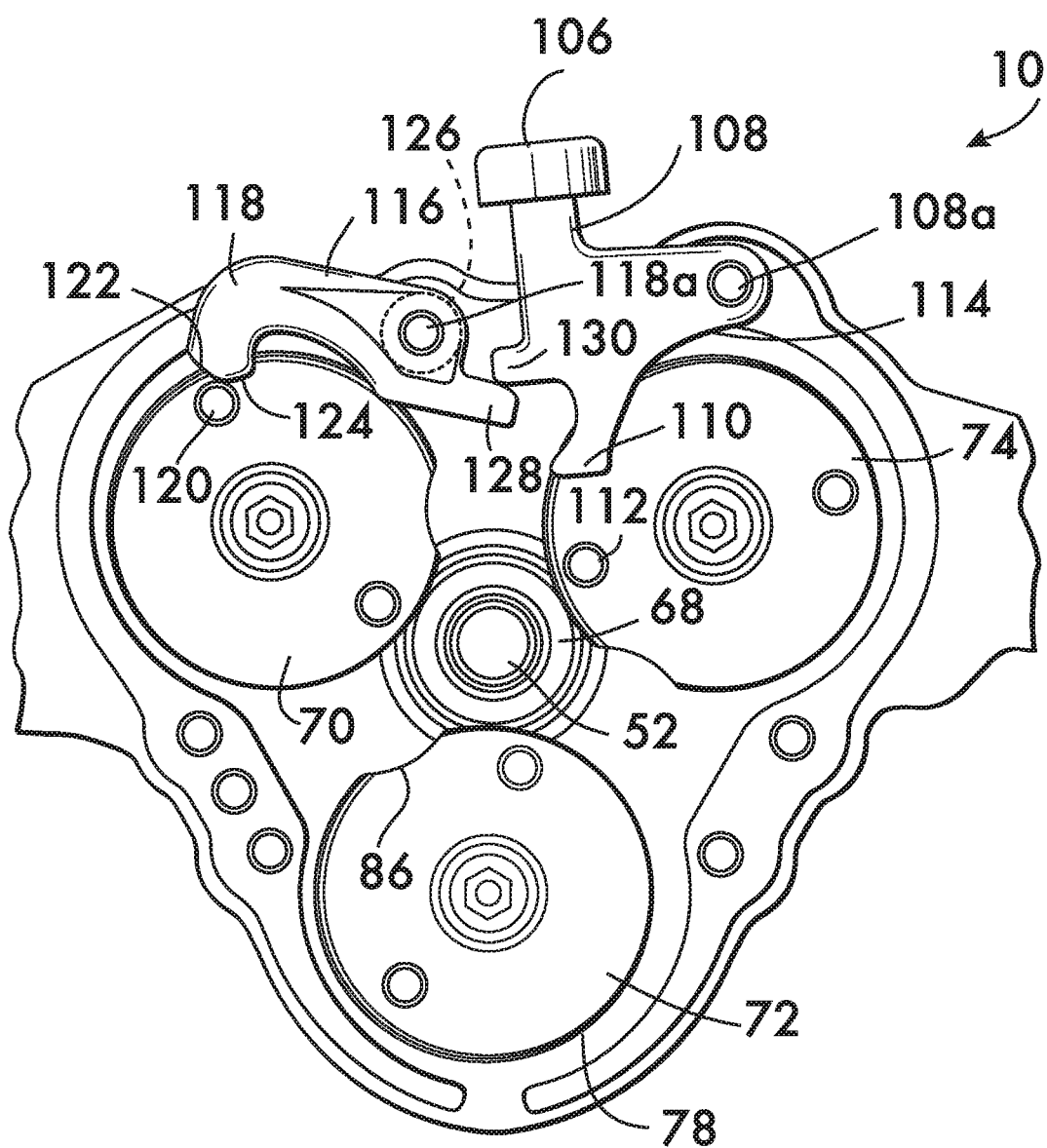

FIGS. 10-12 illustrate an anomalous condition wherein the pipe element is inadvertently rotated counterclockwise. This may happen due to operator error, as power chucks such as the Ridgid 300 are capable of applying significant torque in both directions.

If reverse torque (i.e., torque which will rotate the pipe element counterclockwise as viewed in FIG. 10) is applied before the pipe element has been grooved, the pipe element will merely rotate relative to the cam bodies 70, 72 and 74 and their associated gears 20, 22 and 24 because the discontinuities 86 in the cam surfaces 76, 78 and 80 (see also FIG. 4) and gaps 102 in the traction surfaces 94, 96 and 98 simultaneously face the pinion axis 52 and thus neither surface contacts the pipe element. Additionally the ends of the discontinuities in the cam surfaces, being at the end of the region of constant radius 84, are too steep for the pipe element to climb through frictional contact even if the pipe element and the cam surfaces come into contact. Depressing the actuator lever 108 will have no significant effect, as this action will try to rotate the cams and gears in the opposite direction from how the pipe element, rotating under reverse torque, will try to turn the cam bodies via friction between the cup 68 and pinion 48 when the cup is not fixedly attached to the pinion.

However, if reverse torque is inadvertently applied after a pipe element has been grooved, the regions of constant radius 84 of the cam surfaces 76, 78 and 80 are at approximately the same radius as the floor of the groove and thus will gain purchase and rotate the cam bodies 70, 72 and 74 clockwise. The torque on the cam bodies (and their associated gears 20, 22 and 24) will be augmented when the pipe element further contacts the traction surfaces 94, 96 and 98. As significant torque is applied to the pipe element, measures are taken to prevent damage to the device 10.

FIGS. 10-12 illustrate the condition wherein reverse torque is applied to a pipe element which has already been grooved. As shown in FIG. 10, the cam bodies 70, 72 and 74 are driven clockwise. The finger 120 on cam body 70 is moved away from the hook 118, but the finger 112 of cam body 74 is driven against the actuator lever 108. Actuator lever 108 is free to pivot clockwise in response to this applied force, the pivoting motion allowing the finger 112 to fall off of the first surface 110 of the actuator lever 108 and engage the second (curved) surface 114, thereby avoiding any damage to device 10. As shown in FIG. 11, the cam bodies continue to rotate clockwise and the finger 120 of cam body 70 comes into contact with the first of the two tangent surfaces 122 and 124 on the end of hook 118. As shown in FIG. 12, the first tangent surface 122 is angularly oriented such that it permits the finger 120 to pivot the hook 118 clockwise against its biasing spring 126 in response to the force applied by the finger 120. Pivoting motion of the hook 118 further prevents damage to the device 10. As the finger 120 transitions to the second tangent surface 124 the hook 118 is permitted to pivot counterclockwise under the force of its biasing spring 126 and move again to the ready position shown in FIG. 10, as does the finger 112 on cam body 74. This motion will repeat until the motion of the pipe element is stopped.

Figure 13:
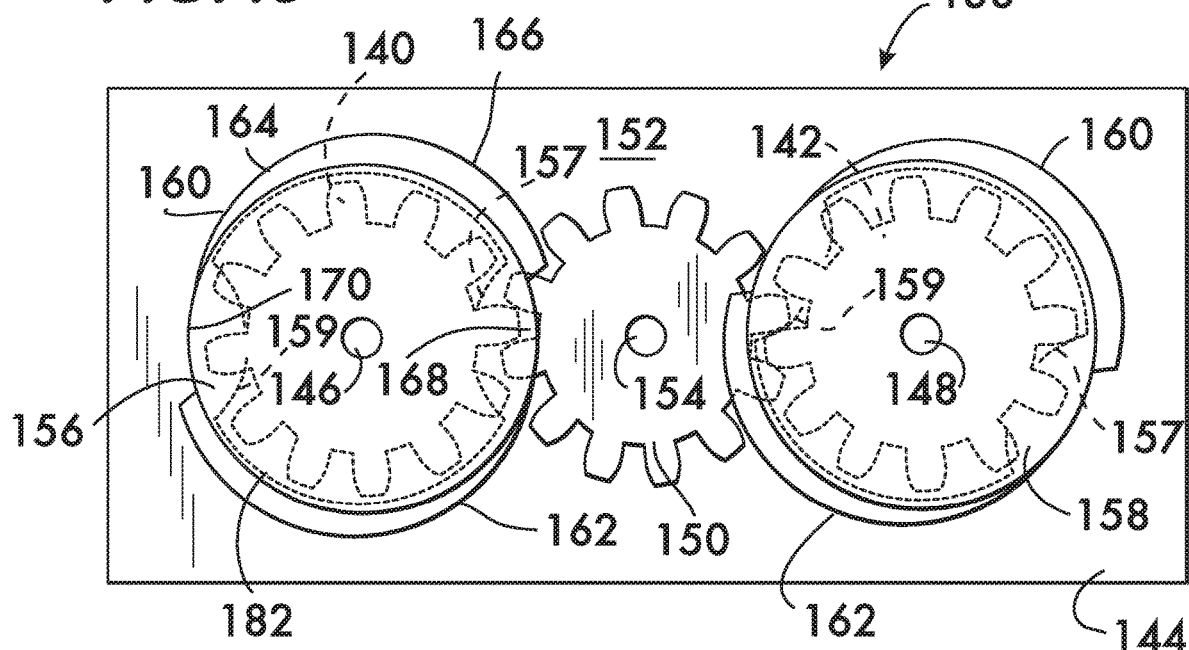
FIG. 13 is a partial view of another example embodiment of a device according to the invention.

FIG. 13 shows another example embodiment of a device 138 according to the invention having at most two gears 140, 142. Gears 140, 142 are mounted within a housing 144 for rotation about respective axes 146, 148. Axes 146, 148 are oriented parallel to one another. A pinion 150 is mounted on housing 144 within a central space 152 which receives a pipe element for processing. Pinion 150 meshes with gears 140, 142 and rotates about a pinion axis 154 oriented parallel to axes 146 and 148.

Figure 14:
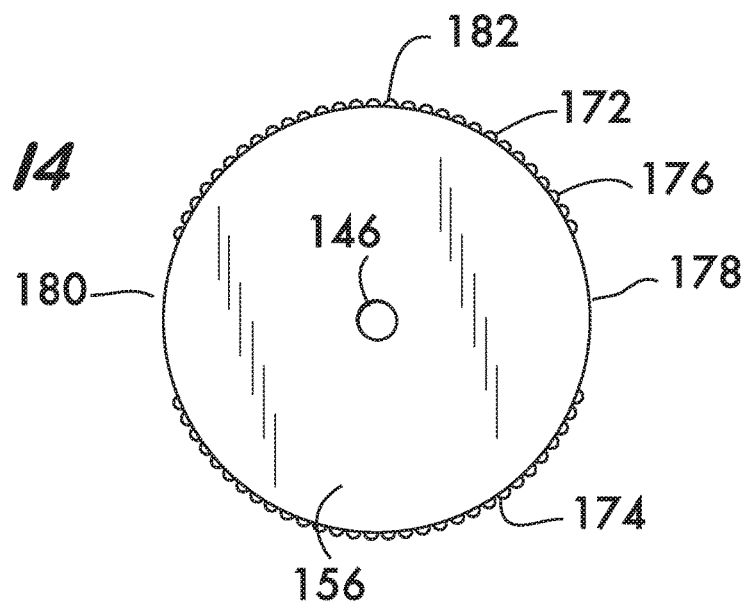
FIG. 14 is an end view of another example cam according to the invention.

Cam bodies 156, 158 are respectively mounted on gears 140, 142. As shown in FIG. 14, each cam body (156 shown) comprises a plurality of cam surfaces, in this example, two cam surfaces 160 and 162. Other cam embodiments, including cams having a single cam surface or cams having more than two cam surfaces are also feasible. The cam surfaces 160 and 162 extend around the respective cam bodies 156 and 158 and are engageable with the pipe element received within the central space 152. The cam surfaces 160 and 162 are circumferentially aligned with one another. Each cam surface 160, 162 comprises a respective region of increasing radius 164 and a region of constant radius 166. The radii are respectively measured about and from the axes of rotation 146 and 148. Respective discontinuities 168, 170 are positioned between each cam surface 160, 162 on each cam body 156, 158.

FIG. 13 also shows a plurality of stop surfaces 157, 159 on each cam body 158, 159. Stop surfaces 157, 159 project transversely to respective cam body axes of rotation 146 and 148 and are positioned adjacent to discontinuities 168, 158 in the cam surfaces 160, 162. Stop surfaces 157, 159 on each cam body 158, 159 are respectively positioned between gears 140, 142 and cam surfaces 160 and 162.

As further shown in FIG. 14, a plurality of traction surfaces, in this example two traction surfaces 172, 174, extend around each cam body 156, 158 (156 shown). Traction surfaces 172, 174 are circumferentially aligned with one another in this example. Traction surfaces 172, 174 each comprise a plurality of projections 176 which extend transversely to respective axes of rotation 146, 148. Respective gaps 178, 180 are positioned between each traction surface 172, 174 on each cam body 156, 158. Gaps 178, 180 are respectively aligned with discontinuities 168, 170 in the cam surfaces 160, 162. As in the earlier discussed embodiment, the cam surfaces 160, 162 on each cam body 156, 158 may be positioned, between the respective gears 140, 142 and the traction surfaces 172, 174, and the cam surfaces may be located proximate to the traction surfaces on each cam body.

Cams having a plurality of cam surfaces and traction surfaces are sized so that they form a complete circumferential groove for a fraction of a rotation. For example, cams 182 as illustrated in FIGS. 13 and 14 having at most two cam surfaces and two traction surfaces form a complete circumferential groove in one half a revolution of the cams.

Although devices having 2 and three cams are illustrated herein, designs having more than three cams are advantageous for forming grooves having a consistent radius, especially in pipe elements having a nominal pipe size of 2 inches or greater, or for pipe elements of any size having a variety of wall thicknesses.

Figure 15:
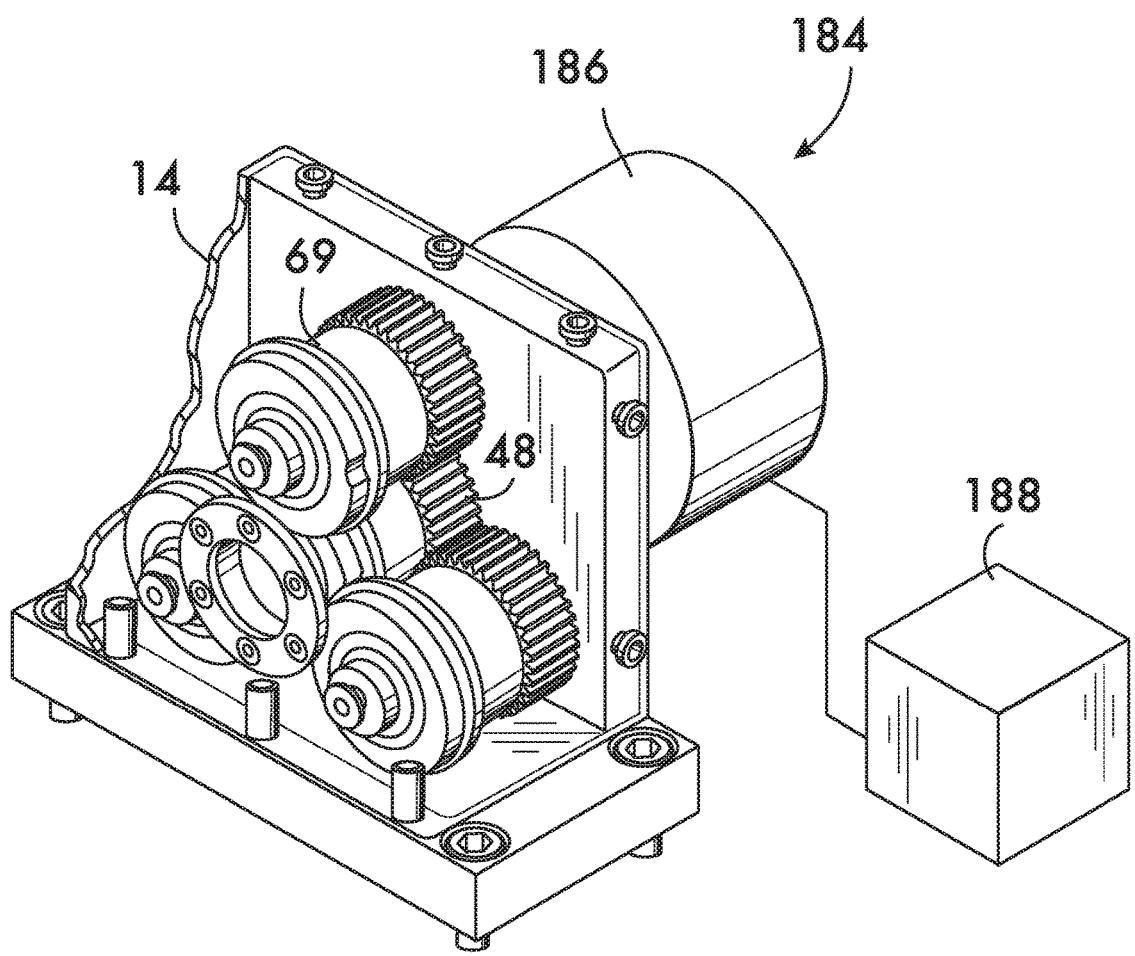
FIGS. 15 and 16 are isometric views of example embodiments of devices according to the invention.

FIG. 15 shows another embodiment 184 of a device for cold working pipes. Embodiment 184 comprises a housing 14 in which cams 69 (shown) or cams 182 are rotatably mounted and mesh with a pinion 48. In this embodiment an electrical motor 186 is coupled to the pinion, either directly or through a gear box. In this arrangement it is advantageous if the electrical motor 186 is a servomotor or a stepper motor. A servomotor or a stepper motor allows for precise control of the number of revolutions of the cams 69 so that the discontinuities in the cam surfaces and the gaps in the traction surfaces are aligned at the beginning and end of the grooving procedure so that the pipe element can be inserted and removed easily. Control of the electrical motor 186 is effected using a programmable logic controller 188 or other similar microprocessor based computer.

Figure 16:
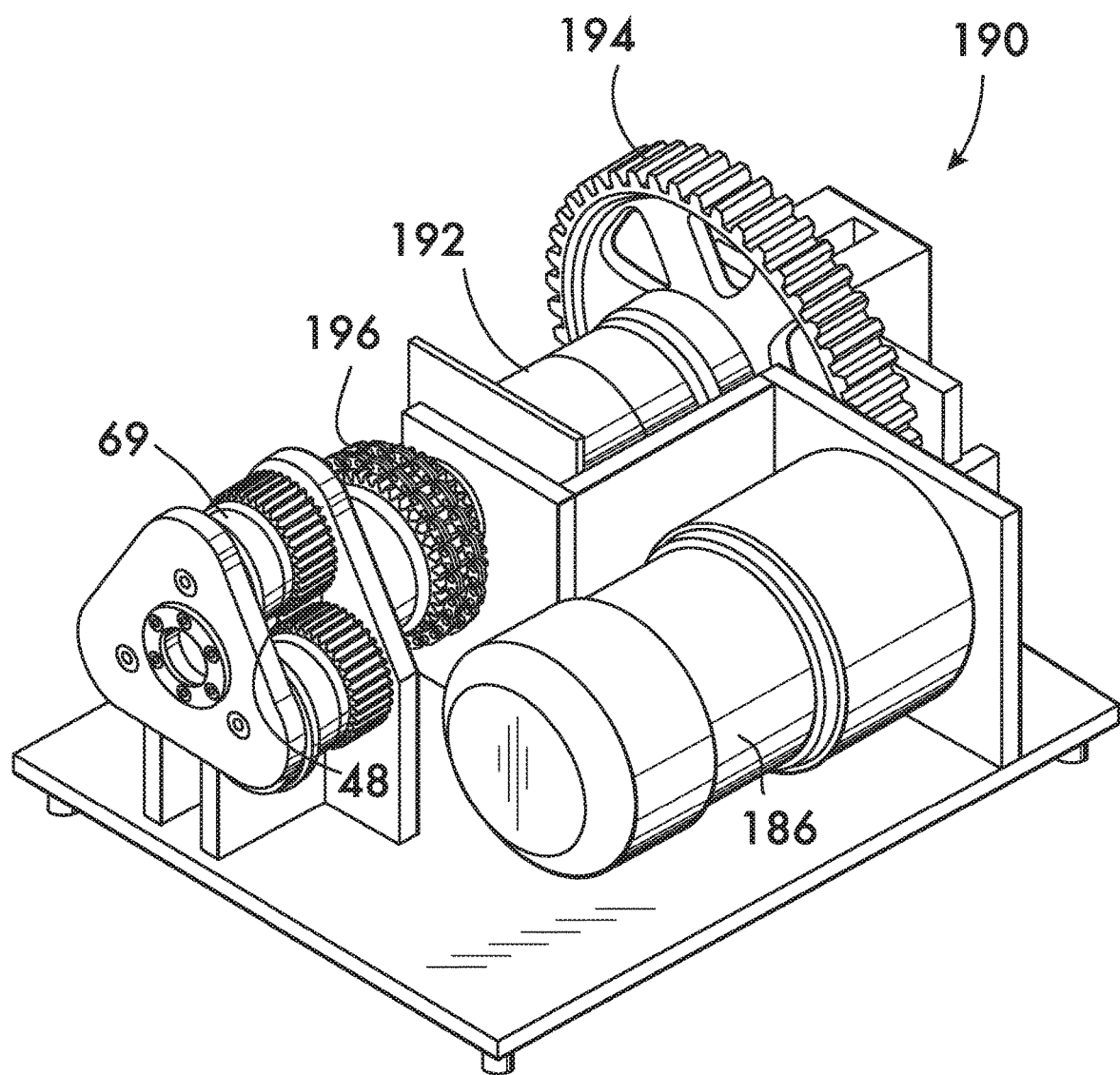

FIG. 16 illustrates another device embodiment 190 wherein a clutch 192 operates between the electrical motor 186 and the pinion 48. In this example, motor 186 is coupled to the clutch 192 through a reduction gear 194. The clutch 192 engages the pinion 48 through a link chain shaft coupling 196 which compensates for misalignment between the clutch and the pinion. Clutch 192 is a wrapped spring type, examples of which are commercially available from Inertia Dynamics of New Hartford, Conn. Wrapped spring clutches are readily adjustable to engage and disengage automatically as needed to produce a desired number of revolutions of pinion 48 to achieve a number of revolutions of the cams 69 required to form a circumferential groove and have the discontinuities of the cam surfaces and gaps in the traction surfaces facing the pinion at the end of the grooving process.

Figure 17:
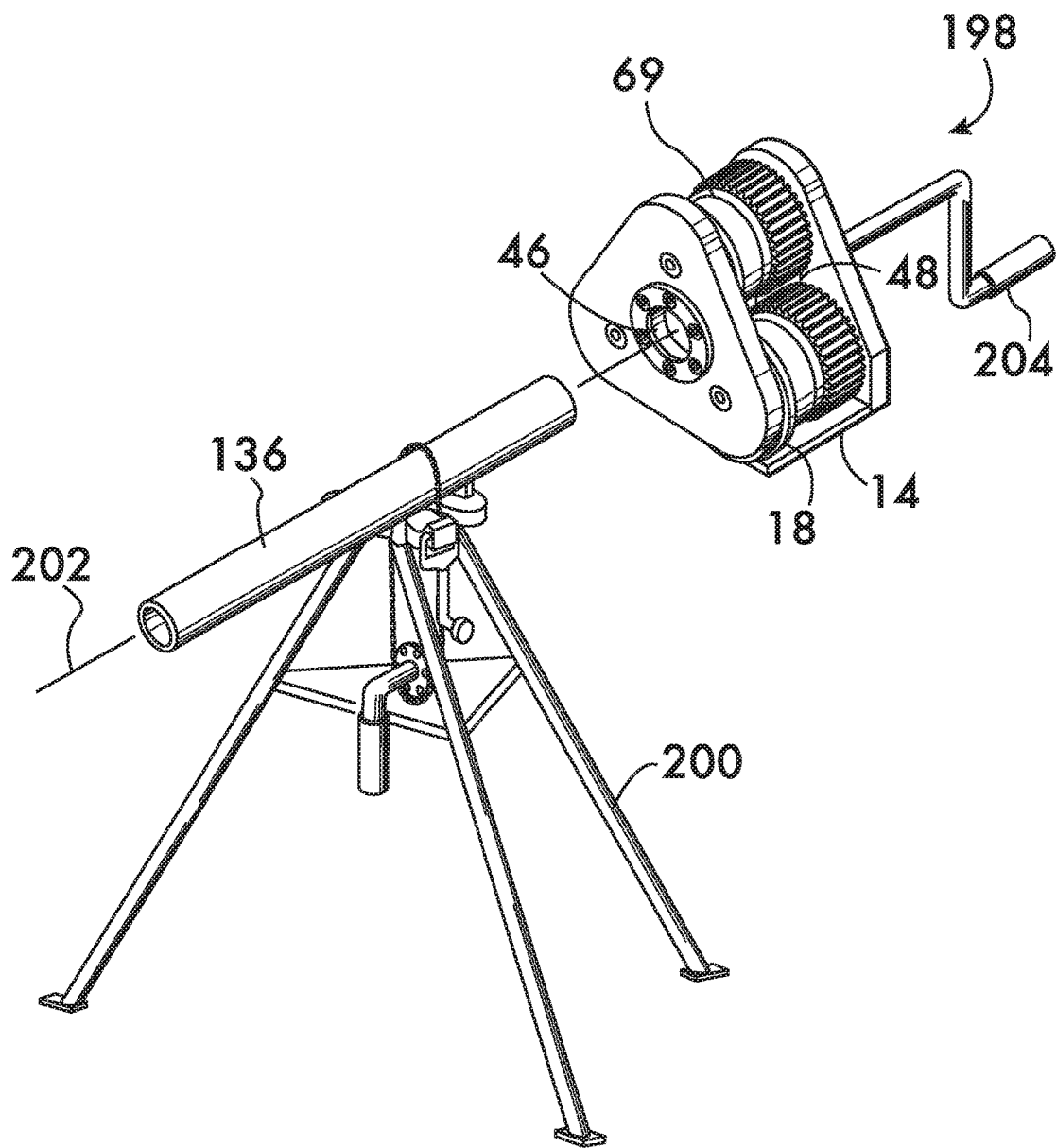
FIG. 17 is an isometric view of another example embodiment of a device according to the invention.

FIG. 17 illustrates another example device embodiment 198 wherein the device is supported directly on the pipe element 136 being cold worked. Pipe element 136 is, in turn, supported on a pipe vise 200 or other convenient support means which will prevent the pipe element from turning when torque is applied about its axis 202. Device 198 is substantially similar to device 10 described above, but has a crank 204 coupled with the pinion 48 for manually turning the pinion, and thereby gears 20, 22 and 24 and their associated cam bodies 70, 72, 74, cam surfaces 76, 78, 80 and traction surfaces 94, 96, 98 (see also FIG. 2) to form a groove of uniform radius over the entire circumference of the pipe element 136. Crank 204 may be coupled to the pinion 48 by directly engaging the pinion shaft 52 (a "direct" coupling between the crank and the pinion), or a gear train (not shown) may be interposed between the crank and the pinion shaft to reduce the torque required for manual operation.

In operation (see FIGS. 2 and 17) the pipe element 136 is affixed to the pipe vise 200 and the opening 46 in the cover 18 of the housing 14 is aligned with the pipe axis 202. The opening 46 is then engaged with the pipe element 136 and the housing 14 is slid onto the pipe element, which enters the central space 44 and is received within the cup 68 to seat the end of the pipe element 136 to the proper depth within the device 198 so that the groove is formed at the desired distance from the end of the pipe element. Optionally, to ensure proper pipe element seating, device 198 may be equipped with the axially movable cup 68 or pinion 48 as described above. When this feature is present the housing 14 is further forced toward the pipe element to move the pinion 48 or cup 68 axially and disengage the cup from the stop surface or surfaces on the cam bodies. Turning of the crank 204 will then turn the pinion 48, which will turn the cams 69 through the gears 20, 22 and 24 meshing with the pinion 48. Rotation of the gears engages the cam surfaces 76, 78 and 80 and the traction surfaces 94, 96 and 98 with the pipe element and the device 198 rotates about the pipe element 136 to form a circumferential groove of uniform radius. Upon one rotation of the cams 69 the groove is complete, and this condition is signaled to the operator by an abrupt decrease in the torque required to turn the crank 204. With the gaps 102 in the traction surfaces and the discontinuities 86 in the cam surfaces facing the pipe element 136, clearance is provided and the device 198 may be removed from the pipe element. The grooved pipe element may then be removed from the vise 200.

Devices according to the invention are expected to operate effectively and cold work pipe elements to the desired dimensional tolerances with precision while operating more quickly and simply without the need for operator intervention.

What is claimed is:

1. A cam for cold working a pipe element, said cam comprising:
   a cam body having an axis of rotation;
   a cam surface extending around said cam body, said cam surface comprising a region of increasing radius and a discontinuity of said cam surface, said radius being measured about and from said axis of rotation;
   a traction surface extending around said cam body, said traction surface comprising a plurality of projections extending transversely to said axis of rotation, said traction surface having a gap therein, said gap being aligned axially with said discontinuity of said cam surface;
   a first stop surface projecting from said cam body transversely to said axis of rotation, said first stop surface being positioned adjacent to said discontinuity of said cam surface.

2. The cam according to claim 1, further comprising a rib projecting from said cam body, said rib positioned adjacent to said cam surface and extending around a portion of said cam body, said first stop surface being positioned on a first end of said rib.

3. The cam according to claim 2, further comprising a second stop surface positioned on a second end of said rib, said second stop surface projecting from said cam body transversely to said axis of rotation, said second stop surface being positioned adjacent to said discontinuity of said cam surface and in spaced relation to said first stop surface.

4. The cam according to claim 3, wherein said first and second stop surfaces each have a concave curvature.

5. The cam according to claim 1, wherein said cam surface further comprises a region of constant radius positioned adjacent to said discontinuity.

6. The cam according to claim 1, wherein said traction surface overlies said cam surface.

7. The cam according to claim 1, wherein said traction surface is positioned on said cam body in spaced relation to said cam surface.

8. The cam according to claim 1, further comprising a gear mounted on said cam body coaxially with said axis of rotation.

9. The cam according to claim 8, wherein said cam surface is positioned between said gear and said traction surface.

10. The cam according to claim 9, wherein said stop surface is positioned between said gear and said cam surface.

11. The cam according to claim 9, wherein said cam surface is positioned proximate to said traction surface.

12. The cam according to claim 1, wherein said traction surface has a constant radius measured about and from said axis of rotation.

13. A cam for cold working a pipe element, said cam comprising:
   a cam body having an axis of rotation;
   a plurality of cam surfaces extending around said cam body, each said cam surface comprising a respective region of increasing radius, said radii being measured from and about said axis of rotation, all of said cam surfaces being circumferentially aligned with one another;
   a respective discontinuity of said cam surfaces being positioned between each of said cam surfaces;
   at least one stop surface projecting from said cam body transversely to said axis of rotation, said stop surface being positioned adjacent to one of said respective discontinuities of said cam surfaces.

14. The cam according to claim 13, wherein said stop surface has a concave curvature.

15. The cam according to claim 13 further comprising at least one rib, said rib being positioned adjacent to a respective one of said cam surfaces and extending around a portion of said cam body, said rib having first and second oppositely disposed ends, said stop surface being positioned at one of said ends of said rib.

16. The cam according to claim 15, further comprising a plurality of said ribs, each said rib having at least one said stop surface at one end thereof, all of said ribs being circumferentially aligned with one another.

17. The cam according to claim 13, wherein each of said cam surfaces further comprises a region of constant radius positioned adjacent to a respective one of said discontinuities.

18. The cam according to claim 17, further comprising:
   a plurality of traction surfaces extending around said cam body, each said traction surface comprising a plurality of projections extending transversely to said axis of rotation;
   a respective gap in said traction surfaces being positioned between each of said traction surfaces, each said gap being aligned axially with a respective discontinuity of said cam surface.

19. The cam according to claim 18, wherein all of said traction surfaces are circumferentially aligned with one another.

20. The cam according to claim 18, wherein said traction surfaces overlie said cam surfaces.

21. The cam according to claim 18, wherein said traction surfaces are positioned on said cam body in spaced relation to said cam surfaces.

22. The cam according to claim 18, further comprising a gear mounted on said cam body coaxially with said axis of rotation.

23. The cam according to claim 22, wherein said cam surfaces are positioned between said gear and said traction surfaces.

24. The cam according to claim 23, wherein said cam surfaces are positioned proximate to said traction surfaces.

25. The cam according to claim 23, wherein said at least one stop surface is positioned between said gear and said cam surfaces.

26. The cam according to claim 18, comprising at most two of said cam surfaces and two of said discontinuities of said cam surfaces.

27. The cam according to claim 18, comprising at most two of said cam surfaces, two of said discontinuities of said cam surfaces, two of said traction surfaces two of said gaps in said traction surfaces and at most one of said stop surfaces.

28. The cam according to claim 18, comprising at least two of said stop surfaces.

* * * * *